US007664858B2

(12) United States Patent
Sauermann

(10) Patent No.: US 7,664,858 B2
(45) Date of Patent: Feb. 16, 2010

(54) METHOD FOR BALANCING LOAD BETWEEN PROCESSORS IN A MULTI-PROCESSOR ENVIRONMENT

(75) Inventor: Volker Sauermann, Dossenheim (DE)

(73) Assignee: SAP AG, Walldorf (DE)

(*) Notice: Subject to any disclaimer, the term of this patent is extended or adjusted under 35 U.S.C. 154(b) by 166 days.

(21) Appl. No.: 10/584,904

(22) PCT Filed: Aug. 13, 2004

(86) PCT No.: PCT/EP2004/009102

§ 371 (c)(1),
(2), (4) Date: Oct. 26, 2006

(87) PCT Pub. No.: WO2005/055059

PCT Pub. Date: Jun. 16, 2005

(65) Prior Publication Data

US 2007/0043865 A1    Feb. 22, 2007

(30) Foreign Application Priority Data

Nov. 21, 2003   (EP) .................................. 03026773

(51) Int. Cl.
G06F 15/173   (2006.01)
G06F 9/46    (2006.01)
(52) U.S. Cl. ...................... 709/226; 718/104
(58) Field of Classification Search ......... 718/102–105; 709/225, 226
See application file for complete search history.

(56) References Cited

U.S. PATENT DOCUMENTS

| 6,031,984 | A  | * | 2/2000 | Walser ........................... 703/2 |
| 6,272,483 | B1 | * | 8/2001 | Joslin et al. .................... 706/62 |
| 2002/0046316 | A1 | | 4/2002 | Borowsky et al. |

FOREIGN PATENT DOCUMENTS

DE     1643364    *  2/2005

(Continued)

OTHER PUBLICATIONS

Math Central—Guess and Check, Nov. 24, 1997, [online], [retrieved on Aug. 12, 2008]. Retrieved from the Internet<URL: http://mathcentral.uregina.ca/QQ/database/QQ.09.97/ramey1.html>.*

(Continued)

*Primary Examiner*—Andrew Caldwell
*Assistant Examiner*—Michael Chao
(74) *Attorney, Agent, or Firm*—Kenyon & Kenyon LLP

(57) ABSTRACT

The present invention relates to a method of assigning objects to processing units of a cluster of processing units, each one of the objects having an object size and an object load, each one of the processing units having a storage capacity and a load capacity, the method comprising the steps of:

a) calculating an index based on object size and object load for each one of the objects, b) sorting of the objects by index to provide a sequence of objects;

c) for each processing unit of the cluster:

assigning of one or more of the objects to the processing unit in sequential order until a remaining storage capacity and/or a remaining load capacity of the processing unit is too small for consecutive objects of the sequence;

deleting of the objects that are assigned to the processing unit from the sequence.

23 Claims, 21 Drawing Sheets

FOREIGN PATENT DOCUMENTS

| | | | |
|---|---|---|---|
| EP | 1145127 | A2 | 10/2001 |
| WO | 0031640 | A2 | 6/2000 |

OTHER PUBLICATIONS

William Leinberger et al. Multi-Capacity Bin Packing Algorithms with Applications to Job Scheduling under Multiple Constraints, University of Minnesota Dept of Computer Science and Engineering, [online], [retrieved on Aug. 12, 2008]. ]. Retrieved from the Internet< URL: http://www.cs.umn.edu/tech_reports_upload/tr1999/99-024.pdf>.*

Joseph J. DiStefano, Allen R. Stubberud, Ivan J. Williams; Schaum's Outline of Theory and Problems of Feedback and Control Systems: Continuous (analog) and Discrete (digital), McGraw-Hill Professional, 1990, ISBN 0070170525, 9780070170520; pp. 156.*

Kang, Algorithms for the variable sized bin packing problem, Feb. 15, 2002, [online], retrieved on Jun. 23, 2009, www.sciencedirect.com/science/article/B6VCT-45J90PP-6/2/a74245f9633f7d1431d85d8ba59f9ab2, pp. 1-8.*

Maruyama K ; Tang D T ; Chang S K: "A general packing algorithm for multi dimensional resource requirements" International Journal of Computer and Information Sciences, vol. 6, No. 2, (Jun. 1977).

Leinberger W; Karypis G; Kumar V: "Multi-Capacity Bin Packing Algorithms with Applications to Job Scheduling under Multiple Constraints (TR 99-024)" 'Online! (May 27, 1999), pp. 1-23, XP002285342.

Coffman E G; Garey M R; Johnson D S: "Approximation Algorithms for Bin Packing: a Survey" Approximation Algorithms for NP-Hard Problems, 'Online! 1996, pp. 1-53, XP002285343.

"Relational Assignments for Distributed Database Systems" IBM Technical Disclosure Bulletin, IBM Corp. New York, US, vol. 31, No. 1, (Jun. 1, 1988), pp. 219-225, XP000045647 ISSN :0018-8689.

Lu E J -L ; Okunbor D I : "An efficient load balancing technique for parallel FMA in message passing environment" Proceedings of the Eighth Siam Conference on Parallel Processing for Scientific Computing, 'Online! (Mar. 1997), pp. 1-8, XP002285344 USA.

Aggarwal G; Motwani R; Zhu A: "The load rebalancing problem" Proceedings of the Fifteenth Annual ACM Symposium on Parallel Algorithms and Architectures, (Jun. 2003), pp. 258-265, XP002285345 USA.

* cited by examiner

Blade 1: Tables 8, 6, 13  Blade 4: Table 15  Blade 7: Tables 19, 17, 7  Blade 10: Table 16
Blade 2: Tables 20, 12  Blade 5: Tables 2, 5  Blade 8: Tables 11, 9
Blade 3: Tables 14, 1  Blade 6: Tables 3, 10  Blade 9: Tables 4, 18

METHOD FOR BALANCING LOAD BETWEEN PROCESSORS IN A MULTI-PROCESSOR ENVIRONMENT

CROSS-REFERENCE TO RELATED APPLICATIONS

This is a 371 national phase application of PCT/EP2004/009102, filed Aug. 13, 2004, claiming priority of European Patent Application No. 03 026 773.6, filed Nov. 21, 2003, which is incorporated herein by reference.

FIELD OF THE INVENTION

The present invention relates to the field of data processing, and more particularly without limitation, to balancing the assignment of objects in a multi-computing environment.

BACKGROUND AND PRIOR ART

Various multi-computing architectures are known from the prior art where a plurality of processing units is coupled to form a cluster. Such architectures are used in parallel processing and also in the emerging field of blade computing.

Blade computing relies on blade servers, which are modular, single-board computers. An overview of blade computing is given in "Architectures and Infrastructure for Blade Computing", September 2002, Sun Microsystems and "THE NEXT WAVE: BLADE SERVER COMPUTING", Sun Microsystems (www.sun.com/servers/entry/blade).

A content load balancing blade is commercially available from Sun microsystems ("Sun Fire™ B10n"). This blade provides traffic and content management functionalities. Content load balancing is achieved based on URLs, CGI scripts and cookies; server load balancing is achieved based on server loads, response times, and weighted round-robin algorithms.

US patent application no. 20030105903 shows a web edge server, which comprises a number of blade servers. A switch and an information distribution module are provided for the purpose of balancing. The information distribution module receives an information message, performs processing on the message to determine a destination, and forwards a message toward the determined destination via an internal communications network.

SUMMARY OF THE INVENTION

The present invention provides for a method of assigning objects to processing units of a cluster of processing units. Each one of the processing units has a certain storage capacity and load capacity. The storage capacity of a processing unit determines the maximum aggregated size of objects that can be stored by the processing unit. The load capacity of the processing unit determines the maximum processing load that the processing unit can handle.

For example, the load capacity of a processing unit can be indicative of the maximum number of access operations the processing unit can provide. Access operations may comprise both read accesses (select) and write accesses (update, insert, delete) to objects stored on the processing unit. For example the load capacity can be expressed as the maximum number of access operations per time unit the processing units can handle.

In order to make maximum usage of the available data processing capacity provided by the cluster of processing units the distribution of the objects over the processing units needs to be balanced. This is accomplished by calculating an index for each object based on object size and object load. For example, the object load is expressed as the expected mean number of access operations per time unit to the object. The objects are sorted by index in order to provide a sequence.

In the following it assumed without restriction of generality that the sequence is sorted in descending order. In this instance the procedure for assigning of objects to processing units starts with the first object of the sequence. One or more of the objects of the sequence are assigned to one processing unit in sequential order until a remaining storage capacity and/or a remaining load capacity of that processing unit is too small for consecutive objects of the sequence. When this condition is fulfilled, the procedure is carried out for the next processing unit, whereby the objects that have been previously assigned to the preceding processing unit are deleted from the sequence. This way a minimum number of processing units that are required for handling a given set of objects can be determined.

In accordance with a preferred embodiment of the invention each processing unit is a single-board computer that has a bus interface to a bus system that couples a plurality of the single-board computers. Each of the single-board computers has its private processing and data storage resources. Data processing tasks or sub-tasks of a complex data processing task are assigned to the single-board computers by a control unit. The control unit can be a separate hardware unit or a software process that runs on one of the single-board computers. An example of such a distributed data processing system is a cluster of blades.

In accordance with a preferred embodiment of the invention the remaining storage capacity of a processing unit is determined by the difference between the storage capacity of the unit and the aggregated size of the objects that have been assigned to the processing unit. Likewise the remaining load capacity of a processing unit is determined by the difference between the load capacity of the unit and the aggregated loads of objects that have been assigned to the processing unit. On the basis of these definitions of the remaining storage capacity and of the remaining load capacity the minimum number of processing units is determined.

In accordance with a further preferred embodiment of the invention the balancing procedure is performed again in order to further improve the quality of the balancing. For this purpose the largest gap between the aggregated sizes of objects being assigned to one of the processing units and the largest gap between the aggregated loads of objects being assigned to one of the processing units and the load capacity are determined.

The size gap is divided by the minimum number of processing units and the result of the division is subtracted from the maximum storage capacity to provide a size threshold level. Likewise, the load gap is divided by the number of processing units and the result of the division is subtracted from the load capacity to provide a load threshold level. When the procedure for assigning the objects to the processing units is performed again, the definition of the remaining storage capacity is the difference between the aggregated size of objects being assigned to the processing unit and the size threshold level whereas the definition of the remaining load capacity is the difference between the aggregated load of the objects being assigned to the processing unit and the load threshold level. As a result of the renewed performance of the assignment procedure, the gap can be substantially reduced.

In accordance with a further preferred embodiment of the invention the theoretical storage capacity limit is used as a size threshold. This size threshold is obtained by calculating the difference between the total of the storage capacities of the processing units and the total of the sizes of the objects and dividing the difference by the minimum number of processing units. The result of the division is subtracted from the storage capacity which provides the theoretical limit.

Likewise the theoretical load capacity limit is used as a load threshold. This load threshold is obtained by calculating the difference between the total of the load capacities of the processing units and the total of the loads of the objects and dividing the difference by the minimum number of processing units. The result of the division is subtracted from the load capacity which provides the theoretical load capacity limit.

On this basis the assignment procedure is performed again whereby the remaining storage capacity is defined as the difference between the aggregated size of the objects of the processing unit and the size threshold whereas the remaining load capacity is defined a the difference between the aggregated load of the objects of the processing units and the load threshold. Typically it will not be possible to assign all of the objects to the minimum number of processing units on this basis. If this is the case one or more iterations are performed.

For one iteration an excess amount of memory is divided by the minimum number of processing units. The result of the division is added to the size threshold. Likewise an excess load is divided by the minimum number of processing units. The result of the division is added to the load threshold. On the basis of the incremented size threshold and/or load threshold the assignment procedure is performed again. This process continues until all objects have been assigned to the minimum number of processing units. This way the quality of the balancing is further improved.

In according with a further preferred embodiment of the invention the size threshold for performing the assignment procedure is varied between the theoretical storage capacity limit and the actual storage capacity. Likewise the load threshold is varied between the theoretical load capacity limit and the actual load capacity. Preferably a new assignment procedure is performed for each permutation of the size threshold/load threshold that can be thus obtained. For each of the resulting assignments of objects to processing units a statistical measure is calculated. This statistical measure is a basis to select one of the assignments for optimal balancing.

In according with a further preferred embodiment of the invention the standard deviation or variance of the sum of the indices of objects assigned to a processing unit is used as a statistical measure. The assignment having the lowest overall quality measure is selected.

In accordance with a preferred embodiment of the invention the object sizes and object loads are normalised for the calculation of the indices. Preferably an index of an object is calculated on the basis of the sum of the normalised object size and normalised object load and the absolute difference of the normalised object size and normalised object load. Preferably the index is obtained by calculating a linear combination of the sum of the normalised object size and normalised object load and the absolute value of the difference of the normalised object size and normalised object load.

In accordance with a preferred embodiment of the invention each one of the processing units is a blade or a blade server. One of the blades can have a program that implements the principles of the present invention in order to perform balancing. This way the number of swap-operations between the blades can be minimised.

In accordance with a preferred embodiment of the invention the principles of the invention are implemented in an application program running on a personal computer. The application program is provided with a list of objects and the estimated sizes and loads of the objects that need to be handled by the cluster of processing units. On the basis of the object sizes and the object loads the minimum number of processing units that are required for the processing task are determined. This information can form the basis for a corresponding investment decision of a customer.

It is to be noted that the present invention is not restricted to a particular type of object. For example, data objects such as tables, arrays, lists and trees are distributed to processing units, e.g. blades, in accordance with the principles of the present invention. For example, each one of the processing units runs a data processing task to which the respective objects are assigned.

BRIEF DESCRIPTION OF THE DRAWINGS

In the following preferred embodiments of the invention will be described in greater detail by way of example only, by making reference to the drawings in which.

DETAILED DESCRIPTION

Figure 1:
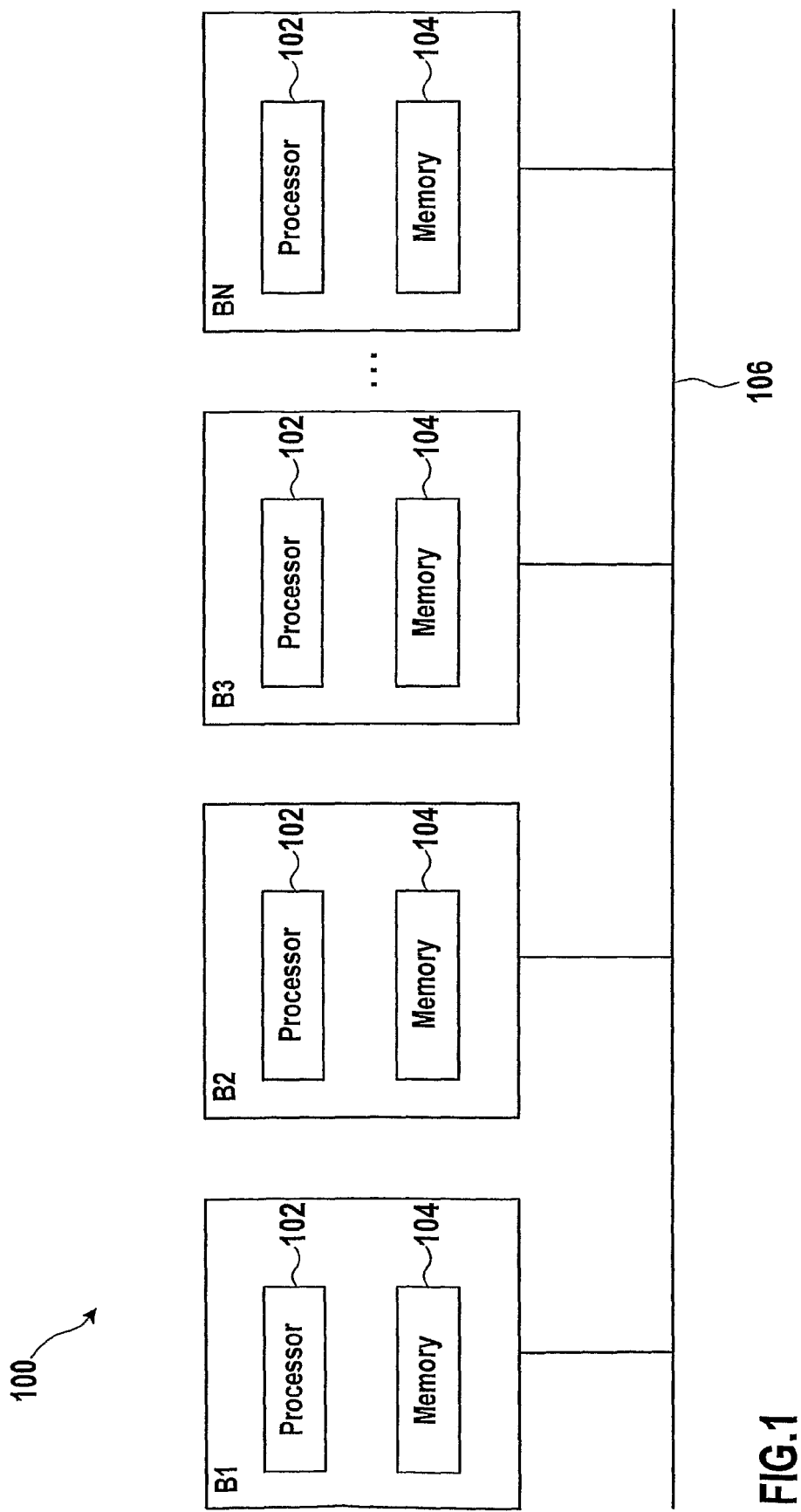
FIG. 1 is a schematic block diagram of a modular computer system having a cluster of blades.

FIG. 1 shows cluster 100 of blades B1, B2, B3, . . . BN. Each one of the blades has processor 102 and memory 104. In the example considered here, all memories 104 have the same storage capacity and all blades have the same load capacity. The blades are coupled by a network 106, such as a bus system. The number N of blades of cluster 100 needs to be chosen such that a given number of M objects of varying sizes and loads can be handled.

For example, cluster 100 implements a so-called search engine. In this instance identical search processes run on each one of the blades. The assignment of data objects, such as index tables, to blades can be stored in a dispatcher unit (not shown on the drawing) of cluster 100. This way data objects are assigned to blades and data processing tasks running on the blades.

Figure 2:
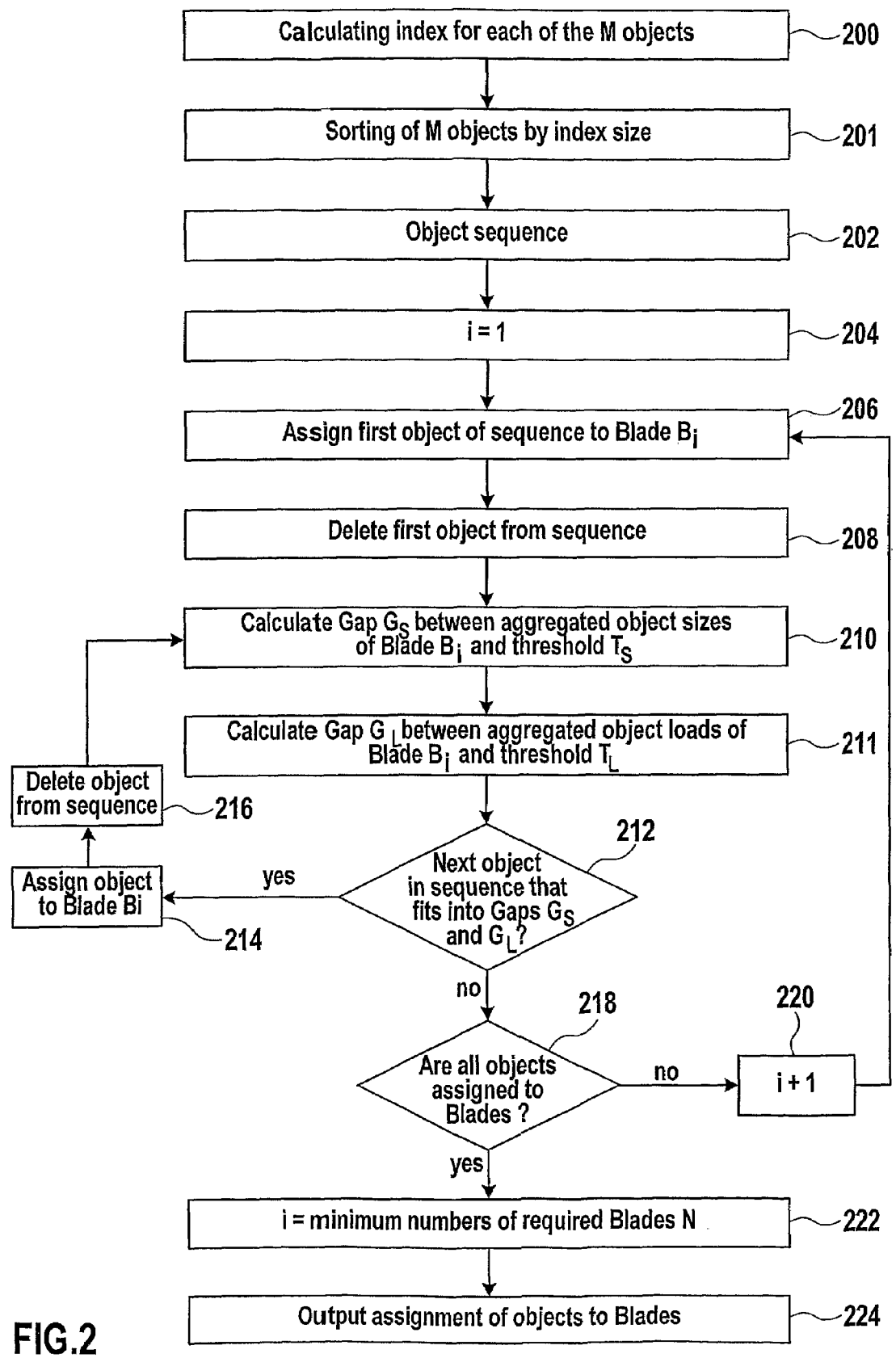
FIG. 2 is illustrative of a flow diagram for assigning of objects to blades and for determining the minimum number of blades.

FIG. 2 shows a procedure for assigning the objects to blades and to thereby determine the minimum value for N.

In step 200 an sorting index is calculated for each one of the M objects. An sorting index of an object is indicative of the amount of blade resources the object requires. The sorting index serves to sort the objects in decreasing order of blade resource requirements.

For example the sorting index is calculated on the basis of the sum of the normalised object load and normalised object size plus the absolute value of the difference of the normalised load and size or a linear combination thereof.

In step 201 a sorting operation is performed in order to sort the M objects by sorting index. The corresponding object sequence is provided in step 202. In step 204 the index i for the blades is initialised to 1.

In step 206 processing of the object sequence starts with the first object of the sequence, i.e. the object having the largest sorting index value. The first object of the sequence is assigned to a first one of the blades, i.e. blade B1, in step 206. In step 208 the first object that has been assigned to blade B1 is deleted from the sequence.

In step 210 the sizes of the objects that have already been assigned to blade B1 are summed up in order to provide an aggregated object size of blades B1. Next the size of a gap $G_S$ between the aggregated object size of blade B1 and a size threshold $T_S$ is calculated. When the assignment procedure of FIG. 2 is carried out the first time, the size threshold $T_S$ is the storage capacity of one of the blades.

In step 211 the loads of the objects that have already been assigned to blade B1 are summed up in order to provide an aggregated load of blade B1. Next a gap $G_L$ between the aggregated object loads of blade B1 and a load threshold $T_L$ is calculated. When the assignment procedure of FIG. 2 is carried out the first time, the load threshold $T_L$ is the load capacity of one of the blades.

In step 212 it is determined whether there is a next object in the ordered sequence that fits into both gaps $G_S$ and $G_L$. In other words, a consecutive object following the first object in the object sequence that has an object size small enough to fit into gap $G_S$ and at the same time has an object load that is small enough to fit into $G_L$ is searched.

The next consecutive object in the sequence that fulfils this condition is assigned to blade B1 in step 214 and deleted from the sequence in step 216 before the control goes back to step 210.

If there is no such object that fulfils the condition of step 212, step 218 is carried out. In step 218 it is determined whether all objects have already been assigned to blades. In other words, in step 218 it is checked whether the sequence is empty. If this is not the case the index i is incremented in step 220 and the control goes back to step 206 in order to assign remaining objects of the sequence to the next blade B2.

If the contrary is the case the index i is the minimum number N of blades that are required to handle the M objects, i.e. i=N. This number is output in step 220. The minimum number N of blades that are required to handle the M objects can be a basis for an investment decision for purchasing of a corresponding number of blades. The assignment of objects to blades is output in step 224 in order to visualise the quality of the object size balancing.

Figure 3:
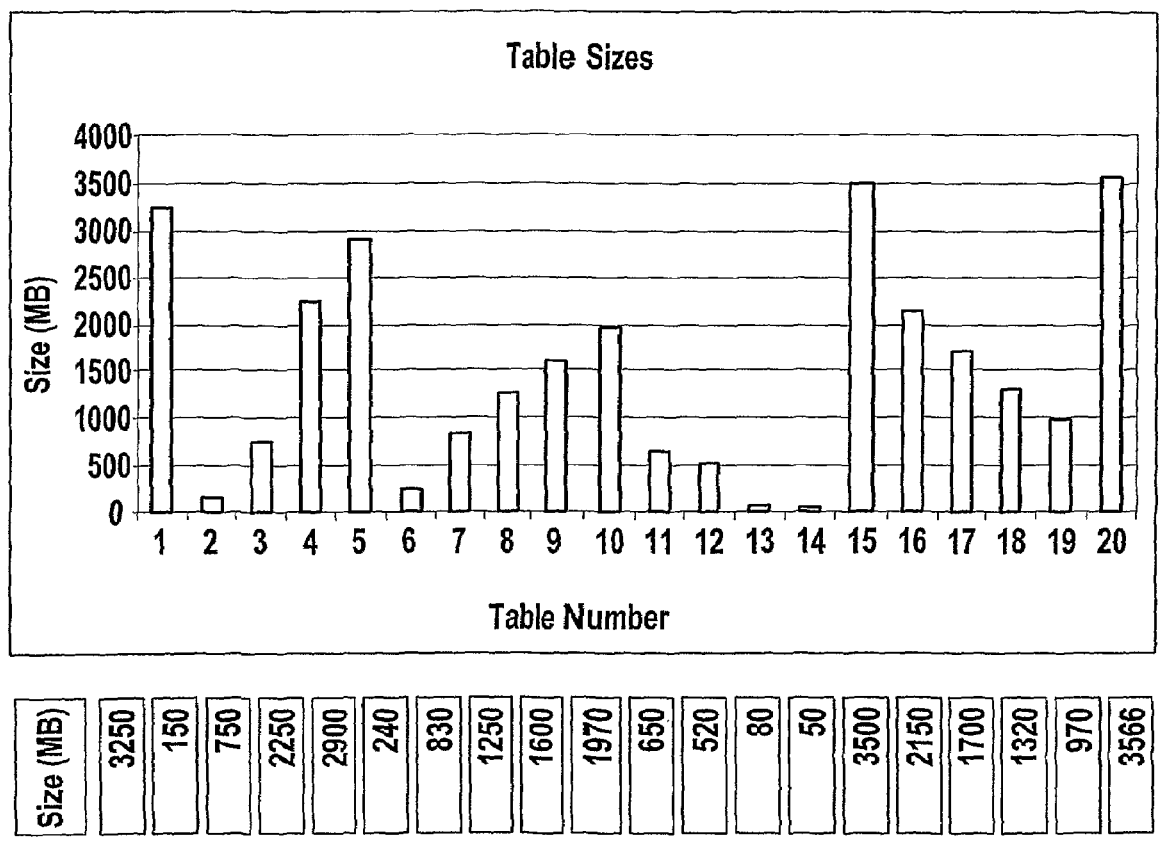
FIG. 3 is an example for tables that need to be assigned to blades.

FIG. 3 shows an example of objects to be assigned to blades. In the example considered here the objects are a number of 20 different tables having various sizes between 50 MB and 3,566 MB as indicated in FIG. 3. For example, table 1 has a size of 3,250 MB, table 2 has 250 MB, table 3 has 750 MB, etc. The table sizes can be actual table sizes or average table sizes that have been obtained by monitoring a real-life data processing system. Alternatively the table sizes are estimates for the purpose of planning cluster 100 (cf. FIG. 1).

Figure 4:
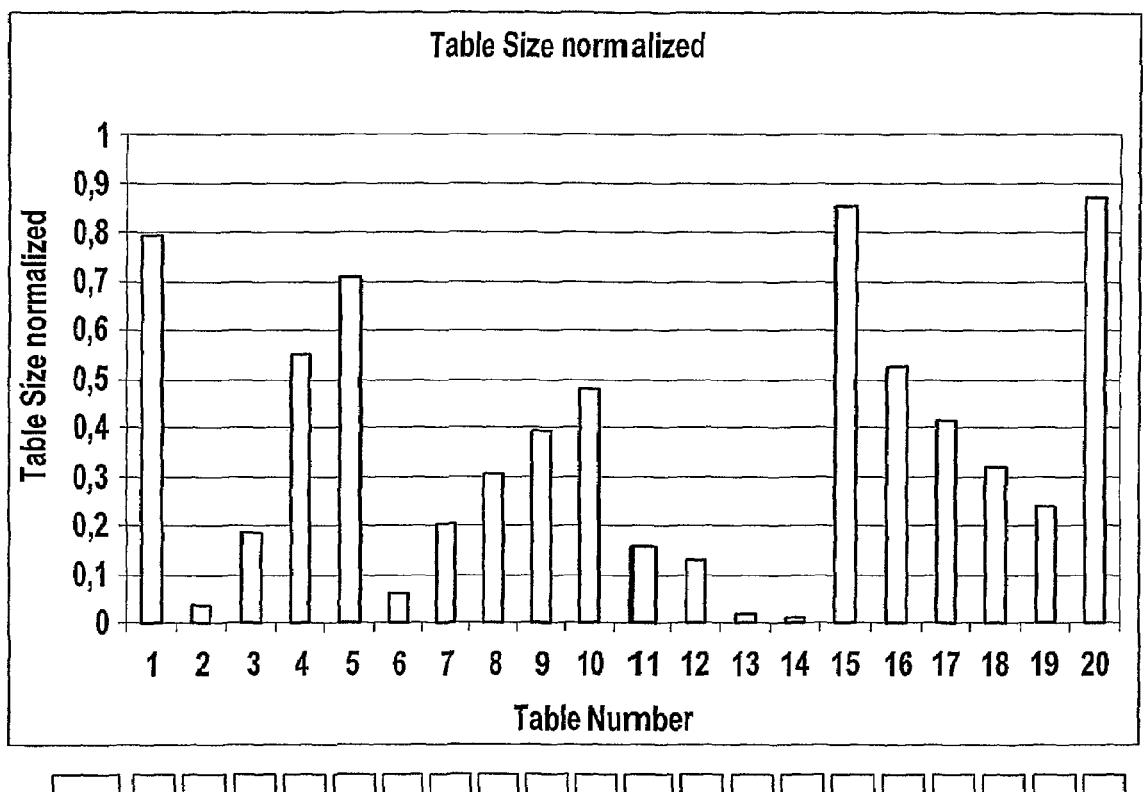
FIG. 4 shows the normalised size distribution of the tables of FIG. 3.

FIG. 4 shows the normalised table sizes of the tables of FIG. 3. The normalised size of a table is obtained by dividing the table size by the maximum storage capacity of one of the blades.

Figure 5:
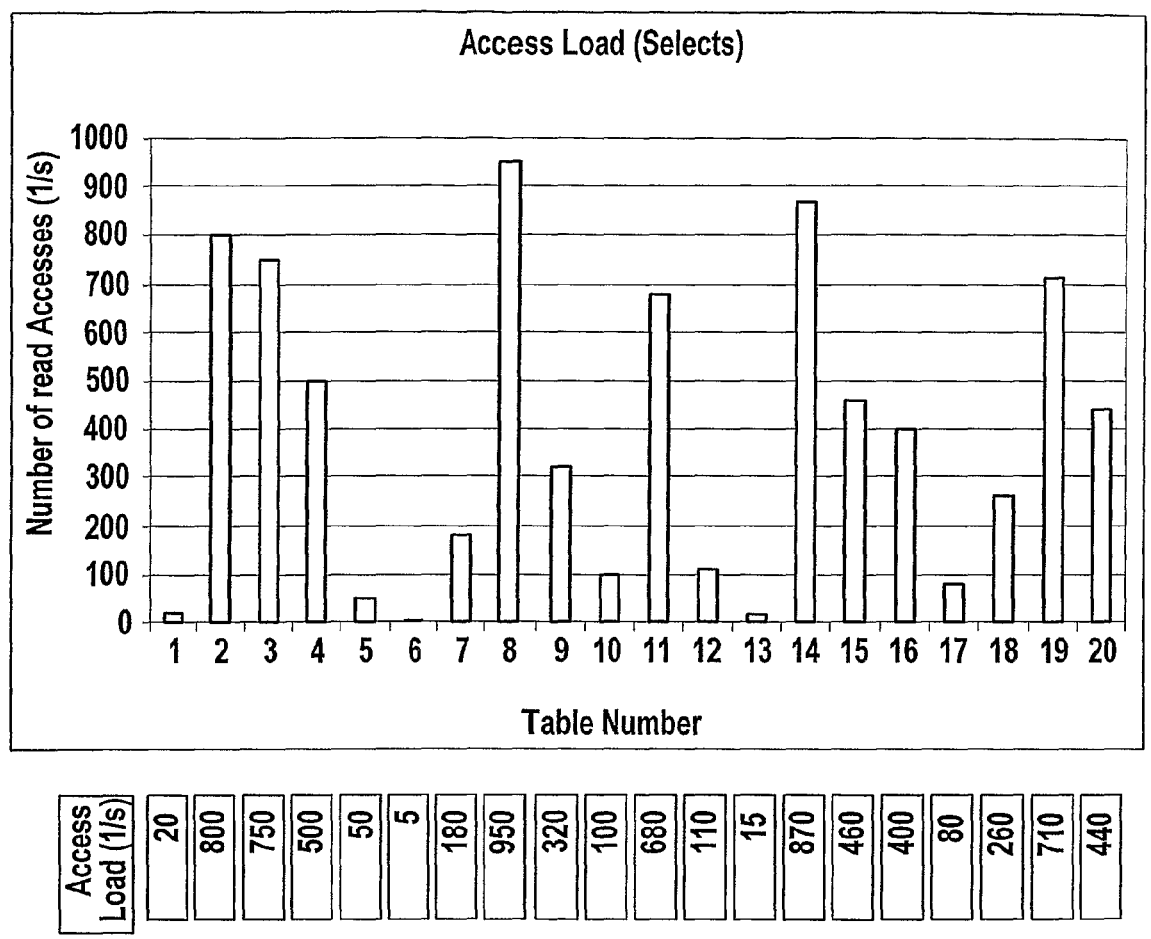
FIG. 5 shows the loads of the tables in terms of the mean number of read accesses per second.

FIG. 5 shows the loads of the tables. In the preferred embodiment considered here the mean number of access operations (selects) per second that are performed or expected to be performed with respect to a table is used as a load indicator. In the example considered here the load as expressed by the number of read accesses per second to a table varies between five read accesses per second (table 6) and 950 read accesses per second (table 8). The table loads given in FIG. 5 can be actual table loads or average table loads that have been obtained by monitoring a real-life data processing system. Alternatively the table loads are estimates or simulation results for the purpose of planning cluster 100.

Figure 6:
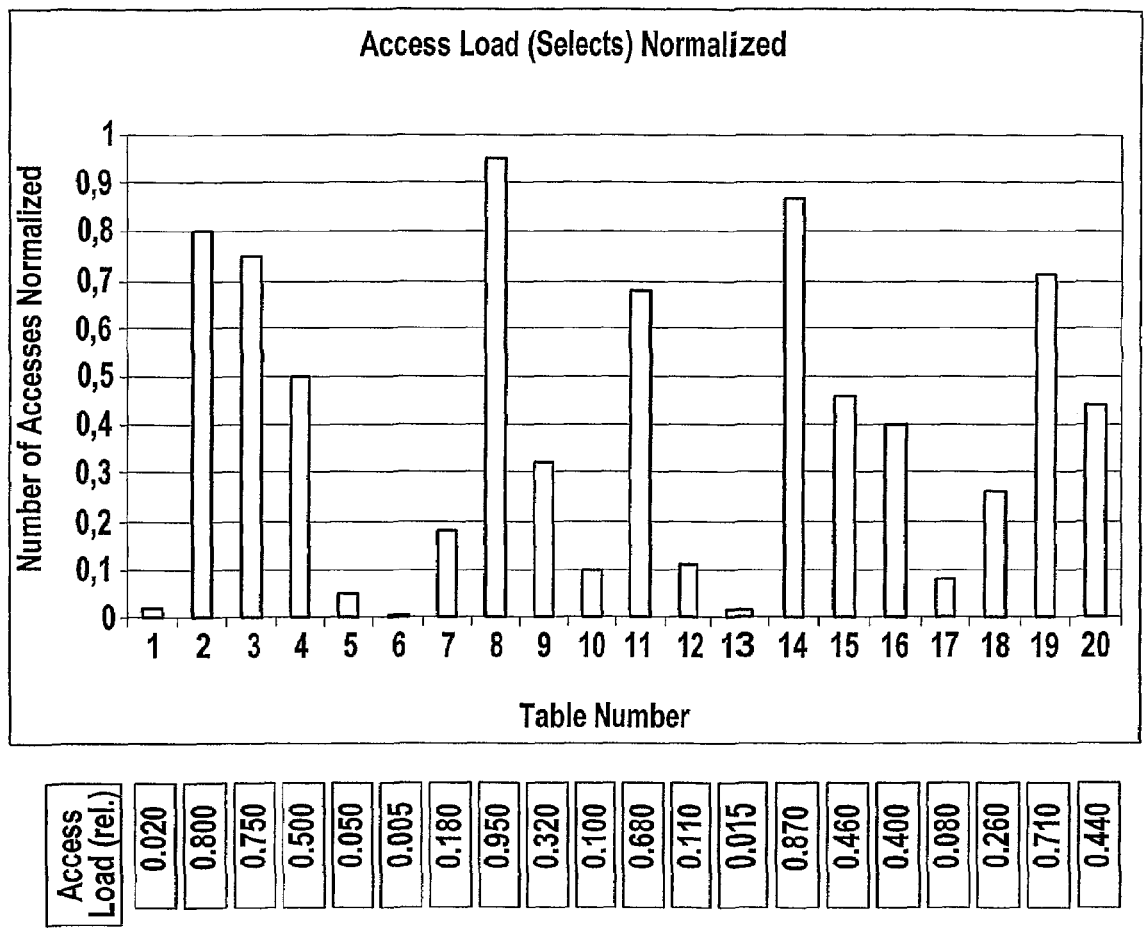
FIG. 6 shows the normalised loads.

FIG. 6 shows the normalised table loads. The normalised table load of a given table is obtained by dividing the number of read accesses per second of that table by the load capacity of one of the blades.

In the preferred embodiment considered here the storage capacity of a blade is 4,096 MB. Hence a normalised table size of one indicates that the table has the absolute maximum size that can be handled by a given blade hardware.

The load capacity of a blade is the maximum possible access load that can be handled by a core engine running on one of the blades in the example considered here. This maximum value can be determined by benchmarks, by experiment or simulation. The load capacity depends on various parameters such as hardware and software characteristics and network bandwidth if a network is used to perform the table accesses. In the preferred embodiment considered here, the load capacity of one of the blades is 1,000 read accesses per second. For the purpose of explanation only read accesses are considered here. However, other typical data processing tasks, such as accesses that involve changes to the data, can also be taken into consideration for determining load capacity and table loads.

Figure 7:
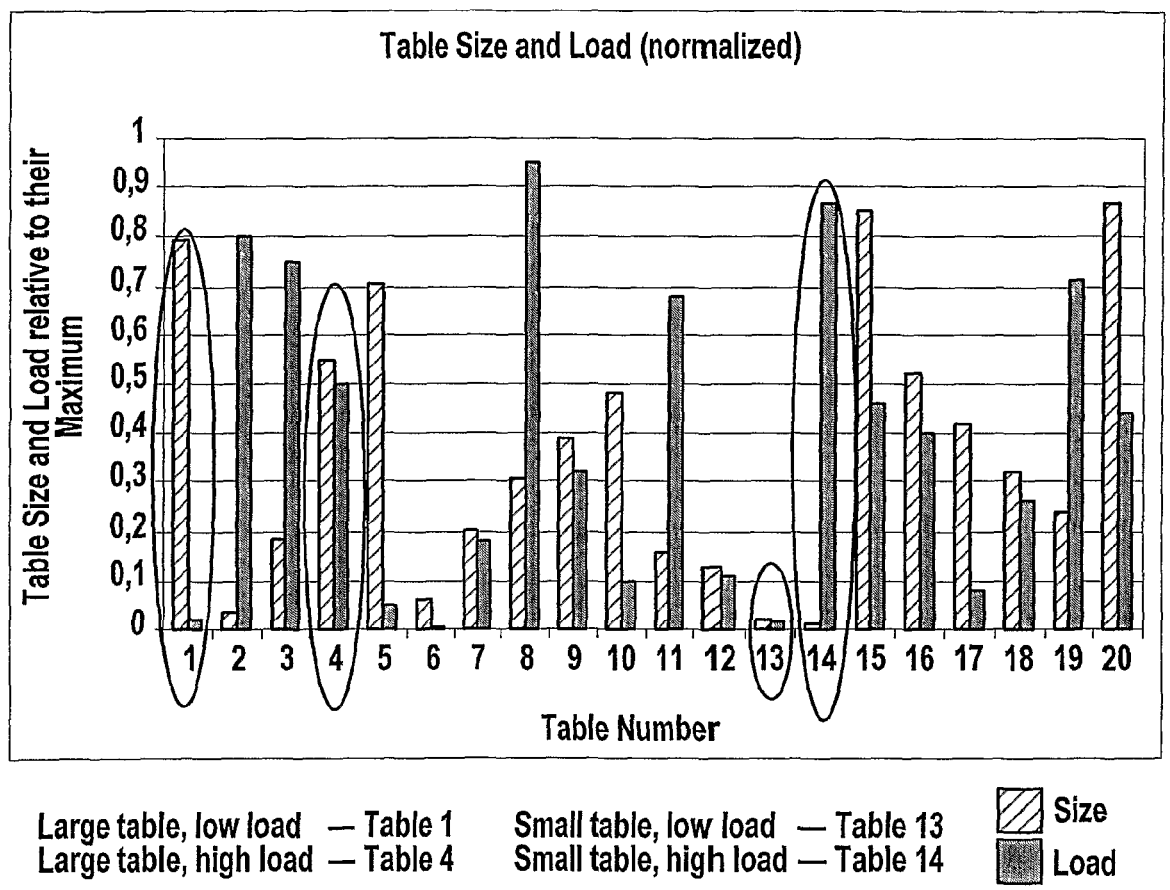
FIG. 7 shows the normalised sizes and loads per table.

FIG. 7 shows a diagram illustrating the various normalised table sizes and table loads. As apparent from FIG. 7 there are tables that require only a minimum amount of blade resources, especially table 13, that has a small table size and a low table load. On the other hand there are tables that require a large amount of blade resources as they have both large table size and high table load. The distribution of tables to blades aims to balance the usage of the respective blade resources with respect to both size and load. The two constraints, i.e. size and load, are combined into a common sorting index that provides an objective measure for the amount of blade resources a given table requires.

The following definition of the sorting index is used for the purposes of explanation only and without restriction of generality:

$$\text{Sorting index} = W1*(size+load) + W2*\text{absolute value}(size-load),$$

where size is the table size, load is the table load

W1 is a weighting factor for (size+load) and

W2 is a weighting factor for the absolute value of the difference of size and load.

For the purposes of the following example the weighting factors W1 and W2 are set to one without restriction of generality.

In this case the above expression evaluates as follows:

If size>load: sorting index=2*size

If size=load: sorting index=2*size=2*load

If size<load: sorting index=2*load.

Figure 8:
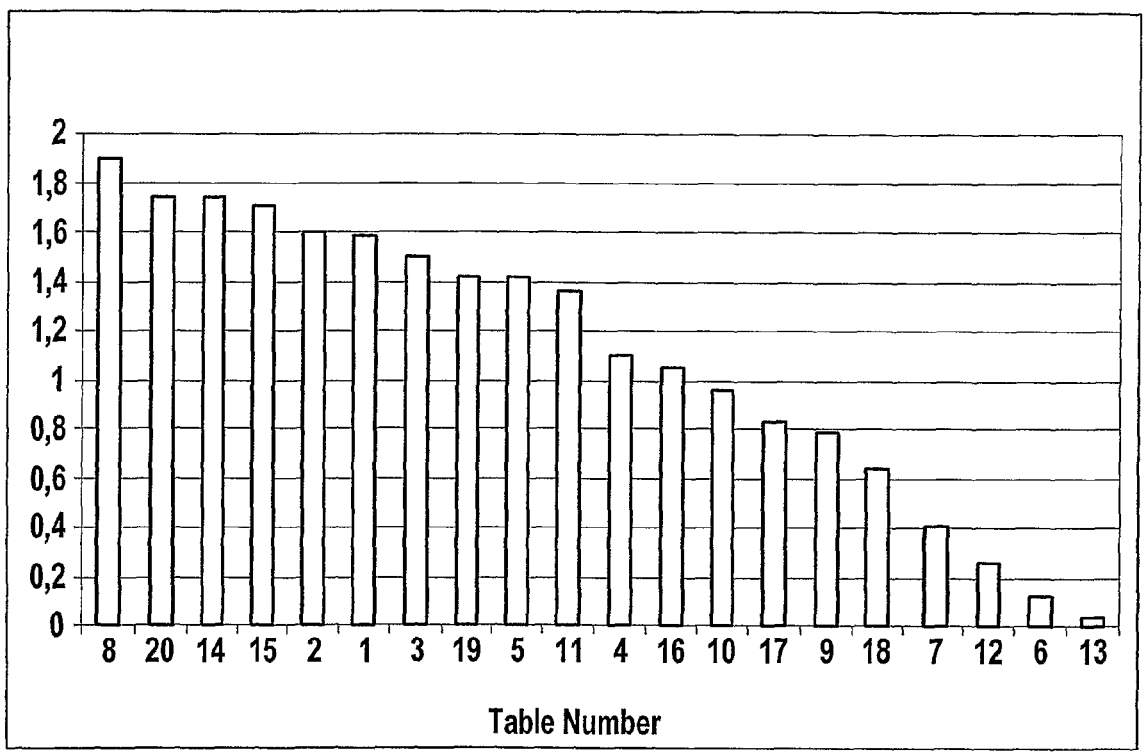
FIG. 8 shows a sorted sequence of the tables.

FIG. 8 shows a sorted sequence in descending order of the sorting indices of the tables. The table that has the largest sorting index value and thus requires the largest amount of blade resources is table 8, whereas the table having the smallest sorting index value and which does require the lowest amount of blade resources is table 13 as apparent from FIG. 8.

Figure 9:
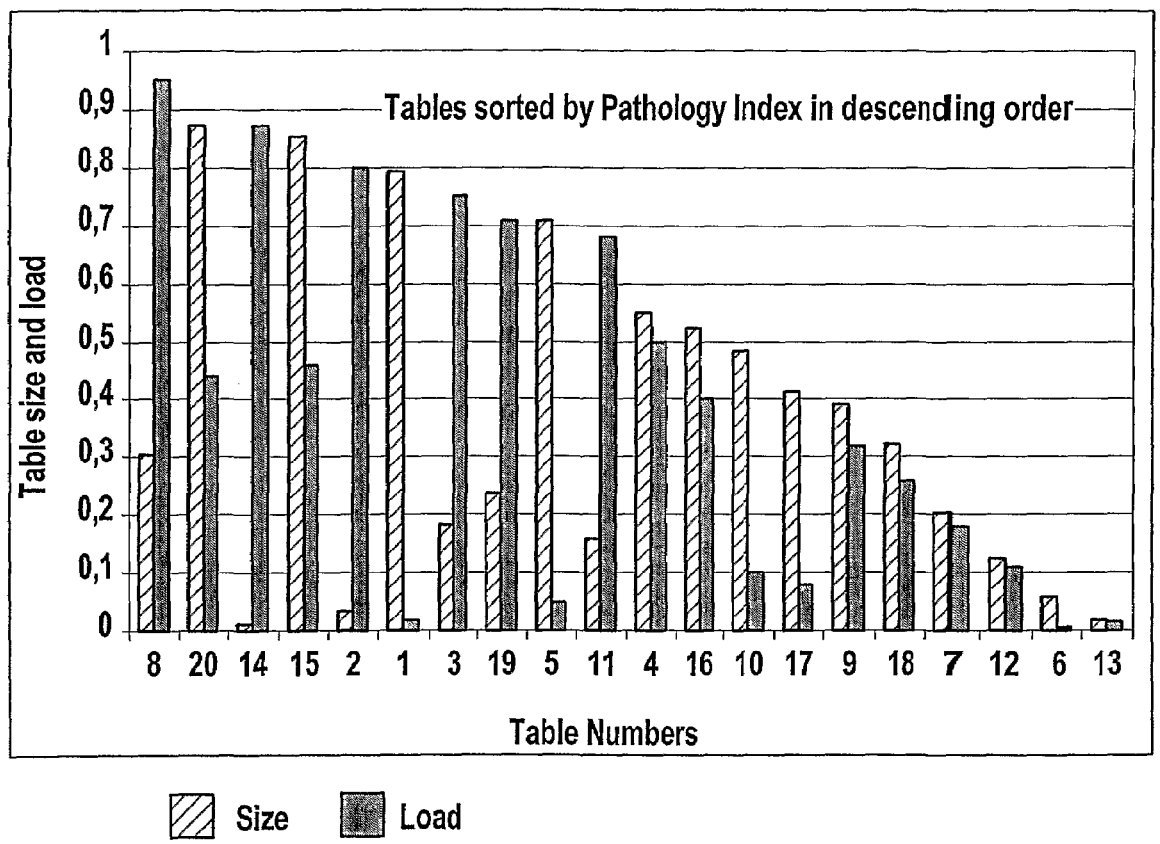
FIG. 9 shows the sorted sequence of the tables illustrating the normalised sizes and loads of each table.

FIG. 9 shows the sorted sequence of FIG. 8 illustrating the normalised table sizes and table loads of the individual tables.

Figure 10:
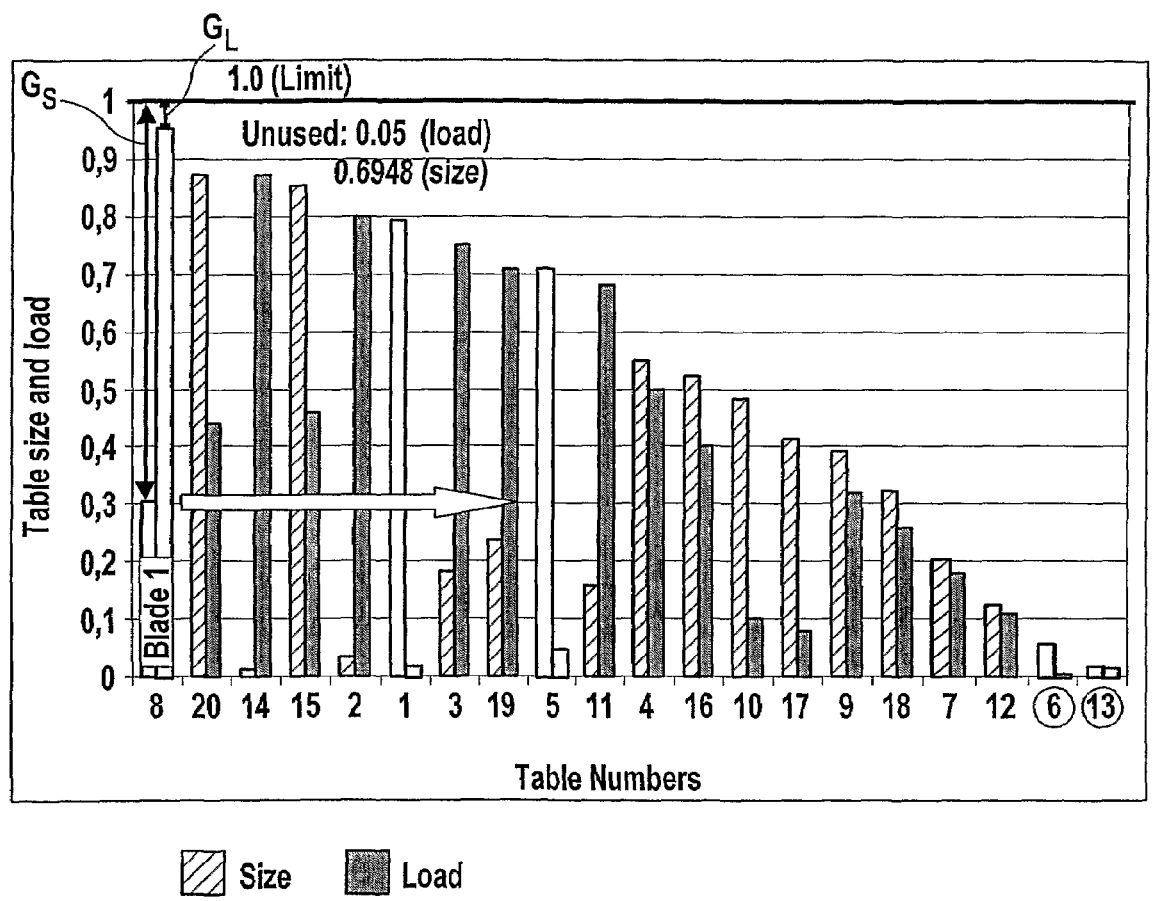
FIGS. 10 to 14 show the assignment of tables to blade 1 of the cluster of blades

FIG. 10 illustrates the first iteration for assigning tables to blades based on the ordered sequence as shown in FIGS. 8 and 9. It is assumed that each one of the blades has a storage capacity that corresponds to a normalised size threshold $T_S=1$ and a load capacity that corresponds to a normalised load threshold $T_L$.

The assignment procedure starts with the first table of the sorted sequence, i.e. table 8. Table 8 is assigned to blade 1 as illustrated in FIG. 10. This results in a normalised gap $G_S$ of unused storage capacity $G_S=0.6948$ and a gap $G_L$ of unused load capacity $G_L=0.05$.

Figure 11:
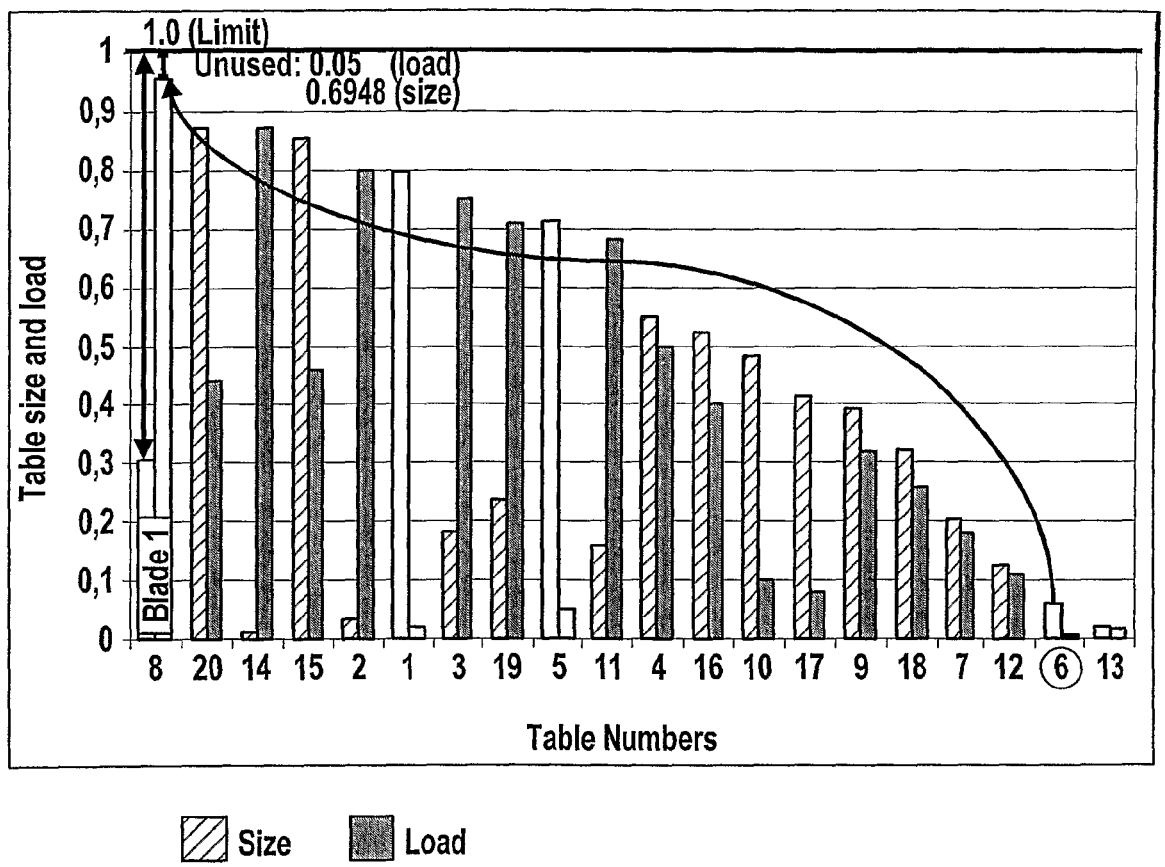

Next consecutive tables in the ordered sequence are searched that have table sizes and table loads that fit into the respective gaps $G_S$ and $G_L$. These are tables 6 and 13. As table 6 precedes table 13 in the ordered sequence, it is assigned to blade 1 as illustrated in FIG. 11.

Figure 12:
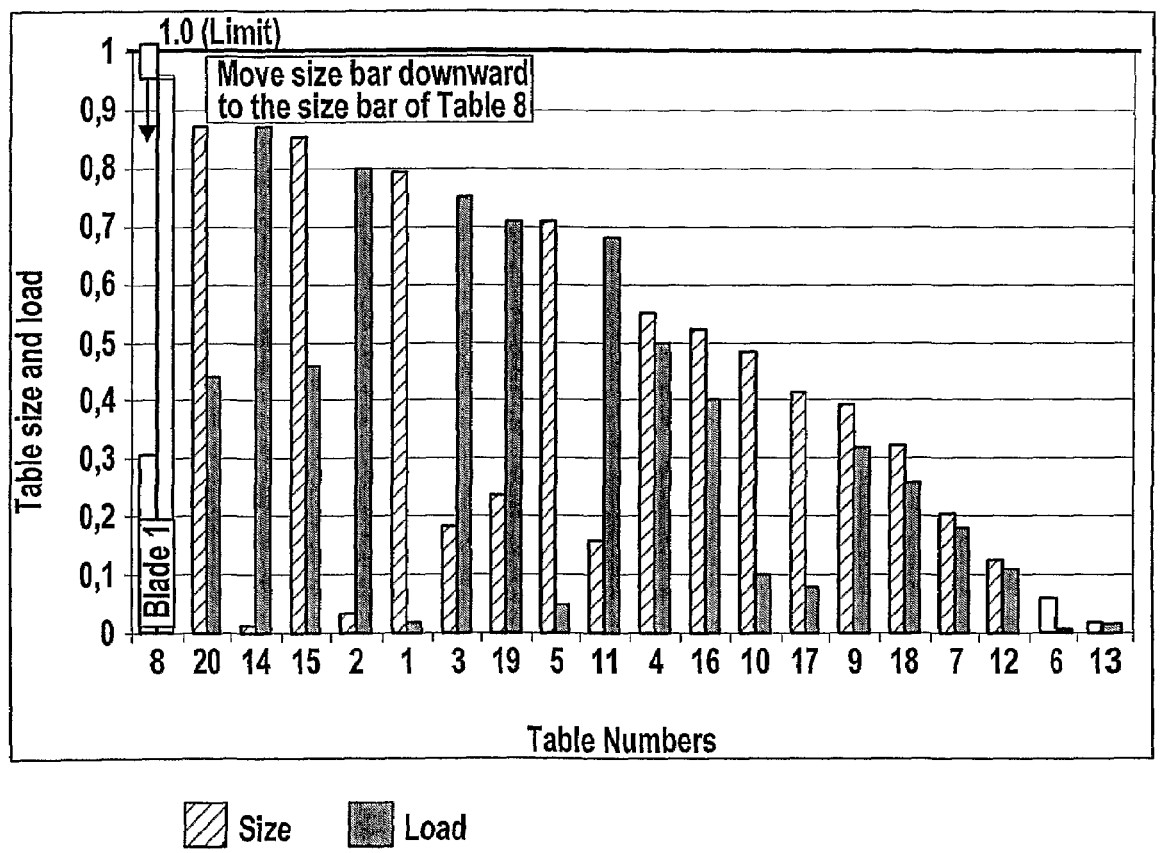
Figure 13:
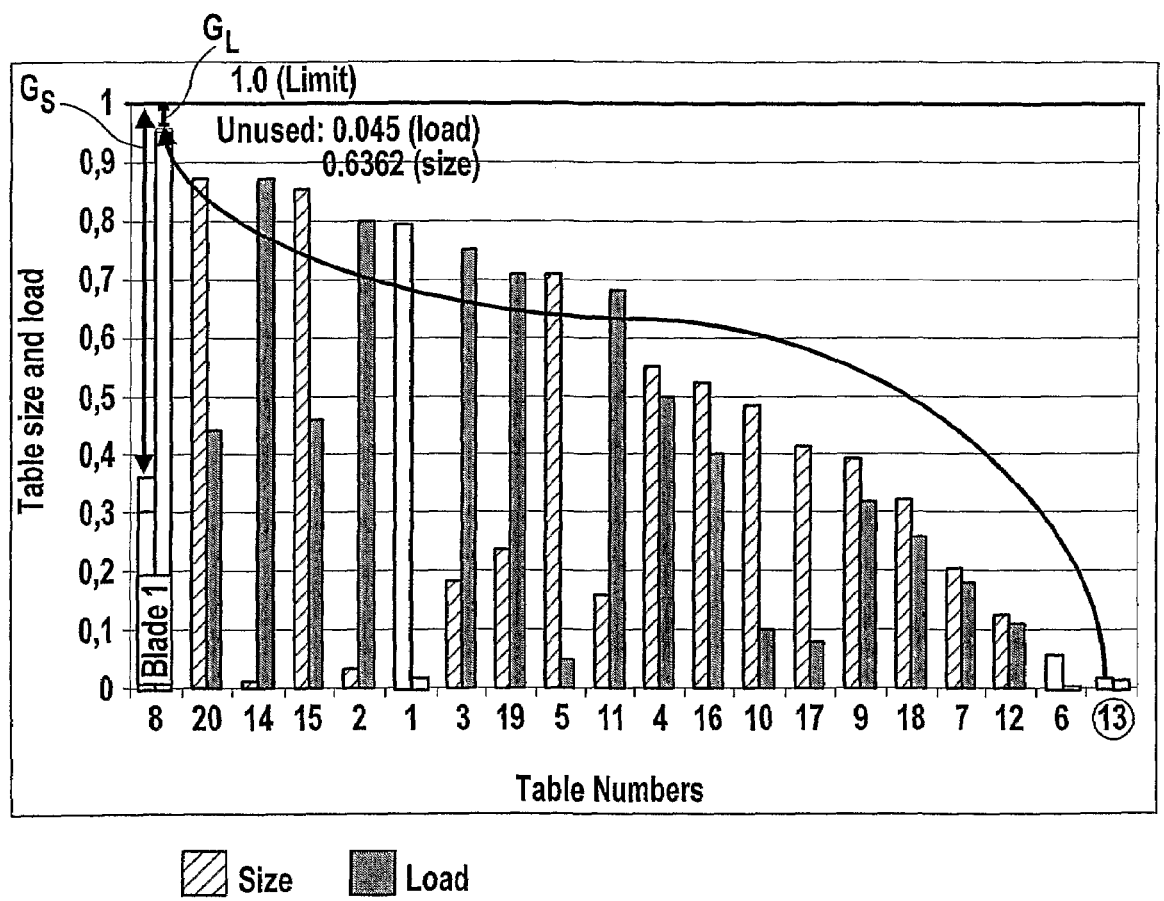

Next the aggregated table size and the aggregated table load of blade 1 is updated as illustrated in FIG. 12. This results in a updated normalised gap $G_S=0.6362$ and an updated normalised gap $G_L=0.045$ as illustrated in FIG. 13. Now tables of the ordered sequence that are consecutive to table 8 that fit into both gaps $G_S$ and $G_L$ are searched.

Figure 14:
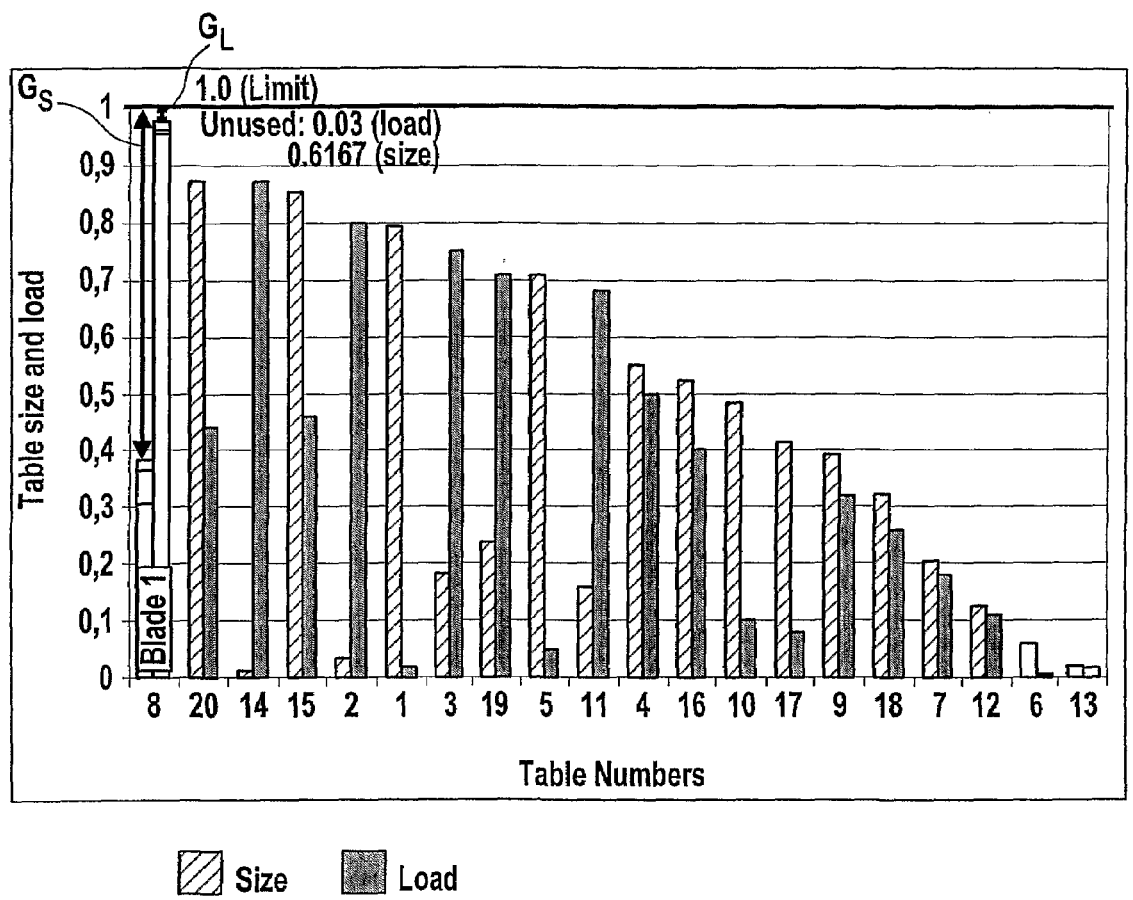

The only table that fulfils both conditions is table 13 which is thus assigned to blade 1 as illustrated in FIG. 13. The result is shown in FIG. 14. The updated normalised gap $G_S$ is 0.6167 and the updated normalised gap $G_L$ is 0.03. No table within the ordered sequence satisfies both constraints.

Figure 15:
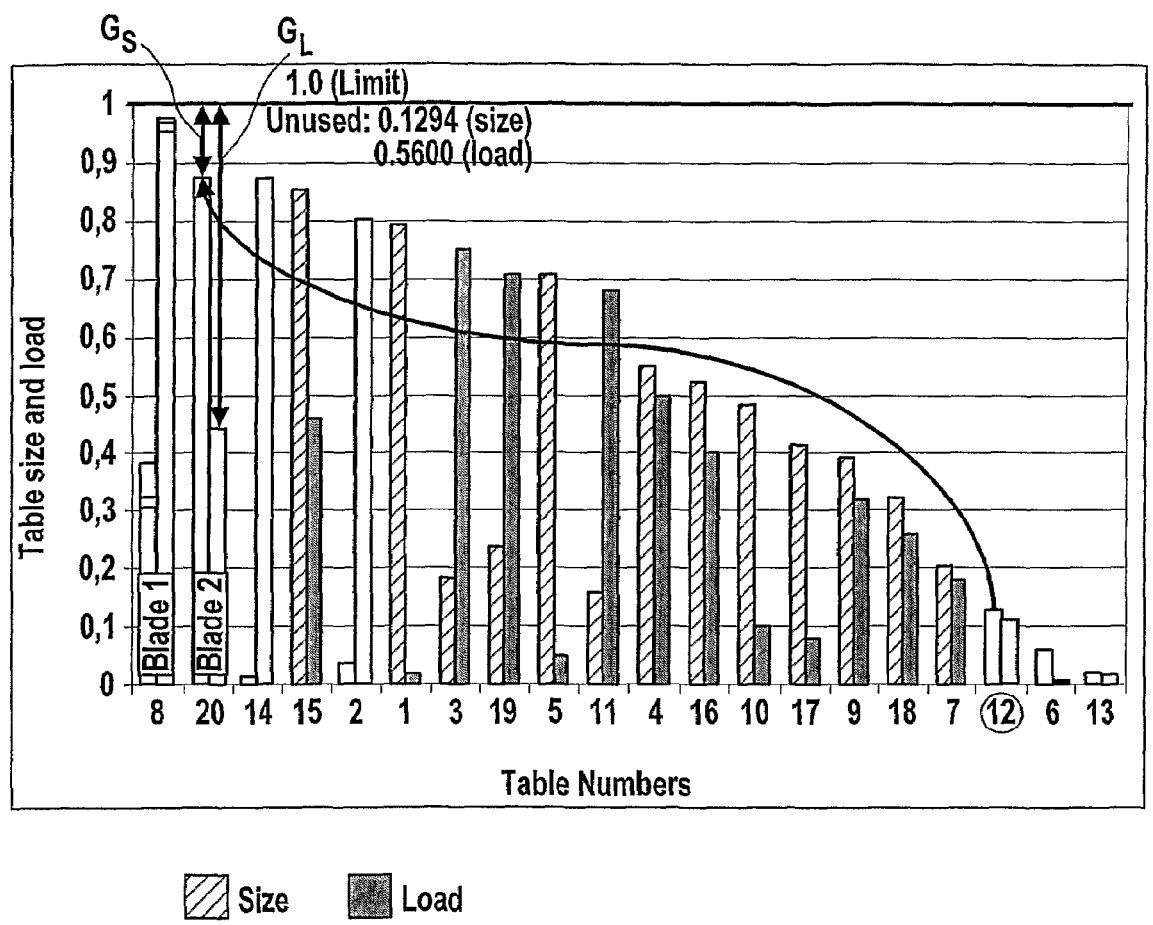
FIGS. 15 and 16 show the assignment of tables to blade 2.

As there remain unassigned tables in the sequence an additional blade 2 is required as illustrated in FIG. 15. By definition the first table of the remaining ordered sequence, i.e. table 20 is assigned to blade 2. This results in normalised gaps $G_S=0.1294$ and $G_L=0.5600$. The only table that satisfies both constraints is table 12 which is thus moved onto blade 2 as illustrated in FIG. 15.

Figure 16:
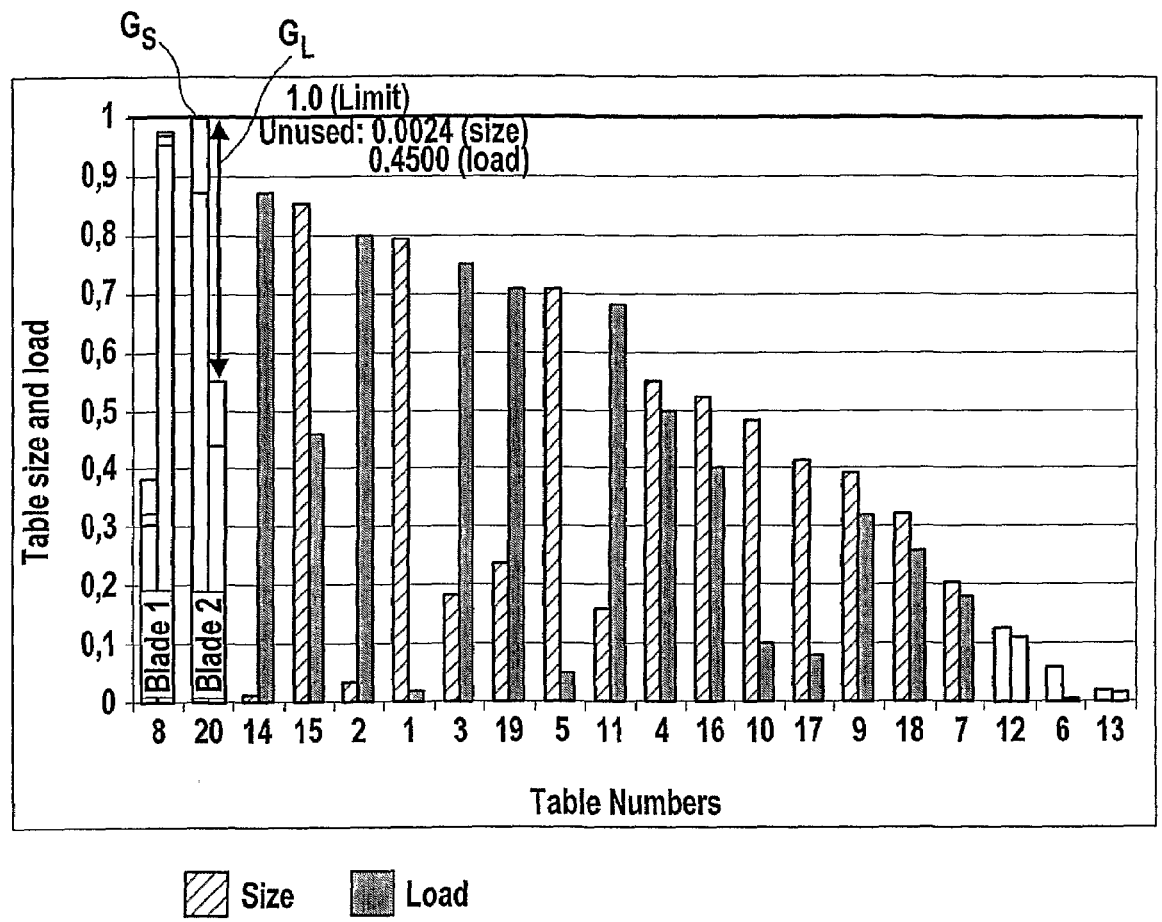
Figure 17:
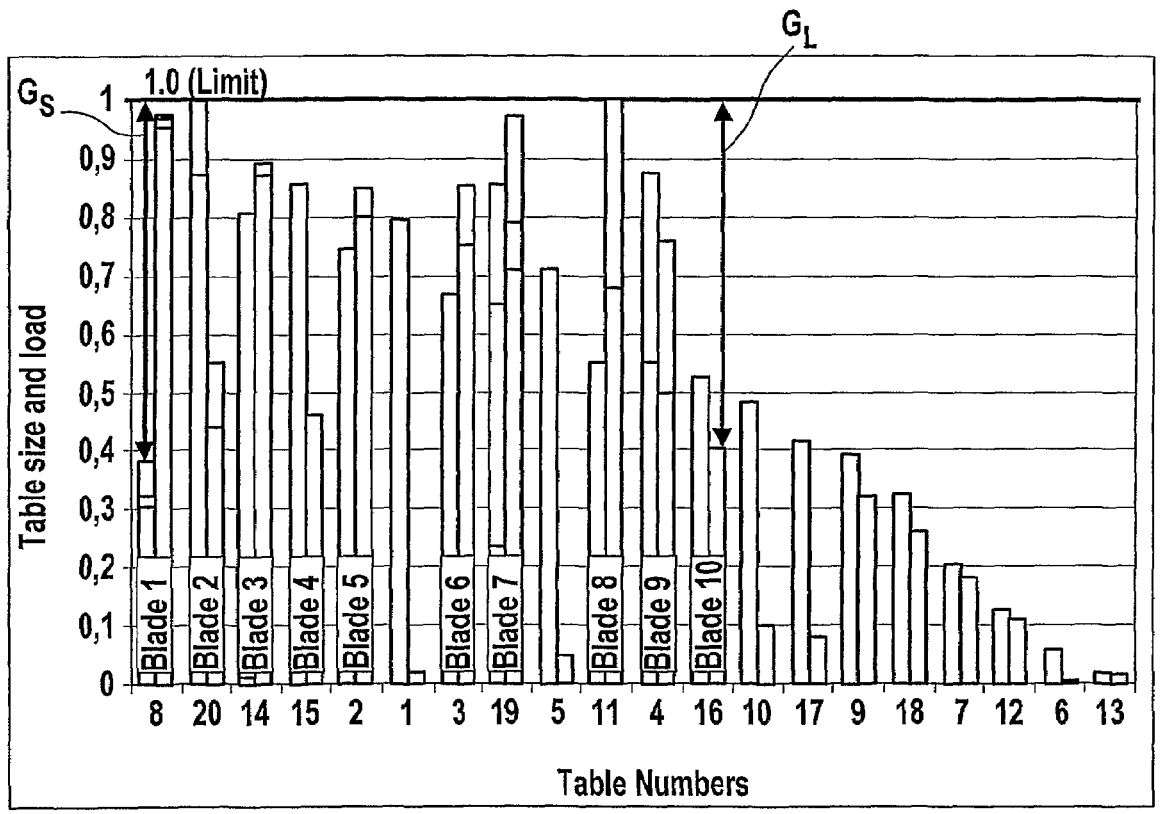
FIG. 17 shows the resulting assignment of tables to blades that is obtained on the basis of the method of FIG. 2.

FIG. 16 illustrates the result of this assignment. The updated normalised gap $G_S$ is 0.0024 and the updated normalised gap $G_L$ is 0.4500. None of the tables of the remaining ordered sequence satisfies these constraints such that an additional blade 3 is required etc. This procedure is carried out until the ordered sequence is empty, i.e. after all tables have been assigned to one blade. The resulting assignment of blades and the resulting minimum number of blades is illustrated in FIG. 17. In the example considered here the minimum number N of blades that is required for handling of all of the tables is N=10.

Figure 18:
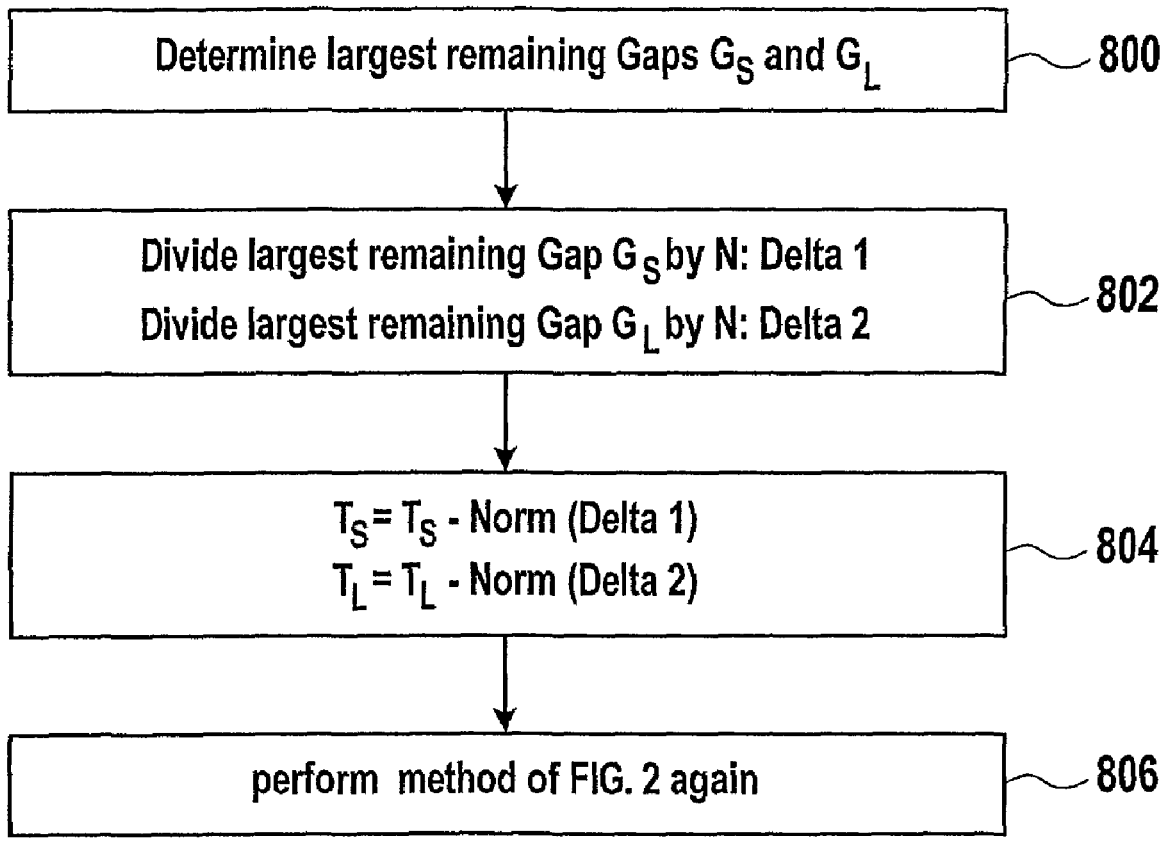
FIG. 18 is illustrative of a preferred embodiment of the invention where the procedure of FIG. 2 is performed again with lower size and load thresholds.

In order to further improve the quality of the balancing the method of FIG. 18 can be carried out on the basis of the result provided by the method of FIG. 2. In step 800 the largest remaining gaps, $G_S$ and $G_L$ are determined as illustrated in FIG. 17. In the example considered in FIG. 17 the largest remaining gap $G_S$ is on blade 1 and the largest remaining gap $G_L$ is on blade 10.

In step 802 the largest remaining gap $G_S$ is divided by N which yields delta 1 and the largest remaining gap $G_L$ is divided by N which yields delta 2.

In step 804 the size threshold $T_S$ is reduced by delta 1 and the load threshold $T_L$ is reduced by delta 2. In step 806 the method of FIG. 2 is performed again with the reduced thresholds as determined in step 804. In case the sorting indices and the original object sequence obtained from the method of FIG. 2 by performing steps 200 to 202 have been saved, these steps can be skipped in order to start processing of the method of FIG. 2 in step 204. The result is a further improved balancing.

Figure 19:
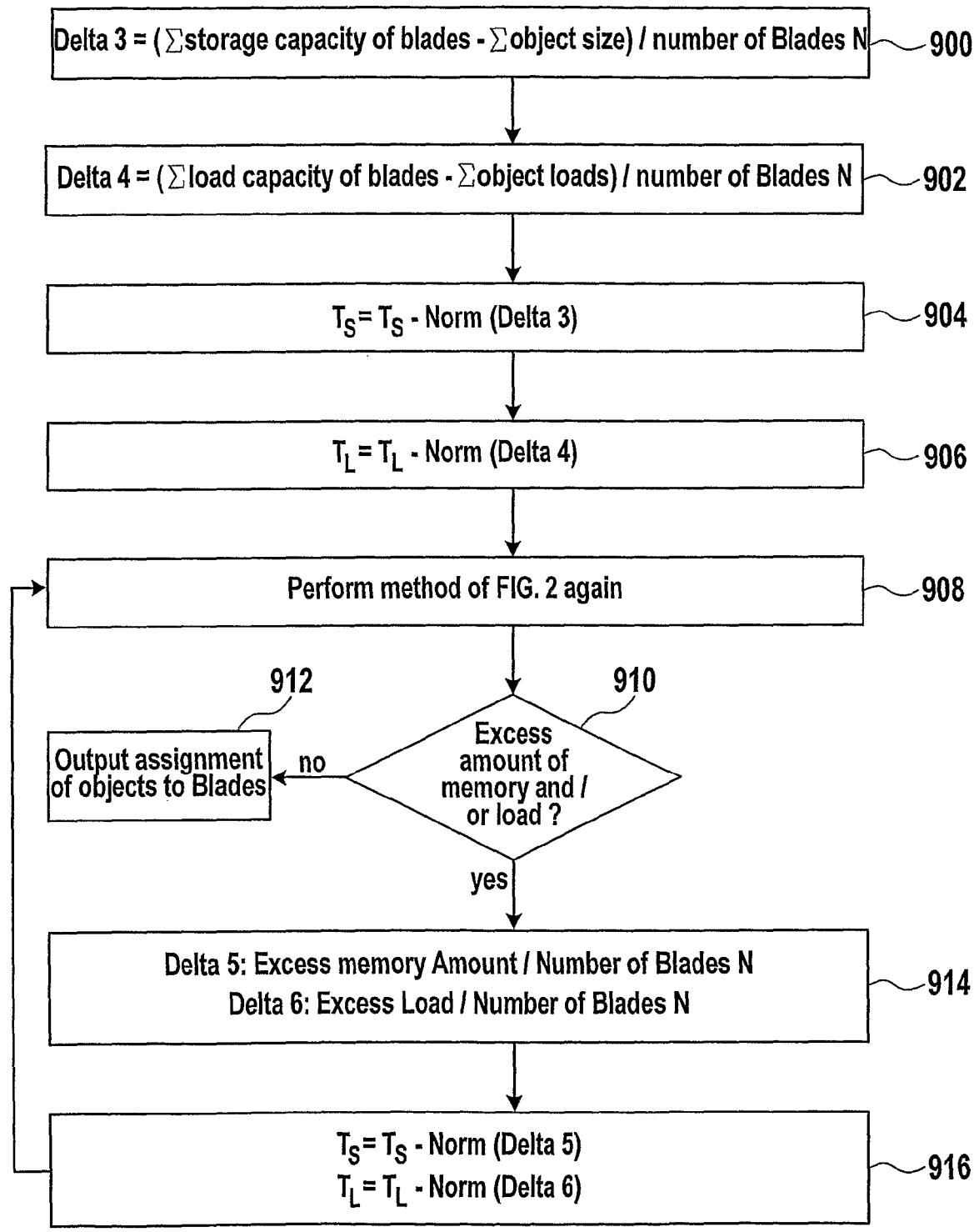
FIG. 19 is illustrative of a preferred embodiment of a method of the invention where the load and size thresholds are varied iteratively.

FIG. 19 shows an alternative approach for refining the balancing. In step 900 delta 3 is calculated by calculating the difference of the sum of the storage capacity of the blades and the sum of the object sizes of all objects to be assigned to the blades and by dividing the difference by the minimum number of blades N. In step 902 delta 4 is calculated by calculating the difference of the sum of the load capacities of the blades and the sum of the object loads of all objects to be assigned to the blades and by dividing the difference by the minimum number of blades N. In the example considered here no normalized values are used in steps 900 and 902.

In step 904 the size threshold $T_S$ is reduced by the normalised value of delta 3. The normalised value of delta 3 is obtained by dividing delta 3 by the storage capacity of one of the blades.

Likewise the load threshold $T_L$ is updated in step 906 by the normalised delta 4. Normalisation of delta 4 is performed by dividing delta 4 by the load capacity of one of the blades.

The reduced size threshold $T_S$ and the reduced load threshold $T_L$ correspond to the theoretical limit of blade resources that are required for handling of the given objects. As the object granularity is finite the theoretical threshold limits will be surpassed in most cases:

In order to refine the balancing the method of FIG. 2 is performed again (step 908) on the basis of the size threshold $T_S$ obtained from step 904 and the reduced load threshold $T_L$ obtained from step 906 with the modification that the number of blades for the renewed performance of the method of FIG. 2 is limited by the minimum number of blades N that has been determined previously. In other words, the assignment procedure of FIG. 2 stops when the minimum number N of blades has been used up; this may have the consequence that there will be an excess amount of memory and/or load requirement for the last blade of the minimum number N of blades considered for the assignment procedure that surpasses the respective thresholds $T_S$ and/or $T_L$. Again steps 200 to 202 of the method of FIG. 2 can be skipped in case the sorting indices and the sorted sequence has been stored when the method of FIG. 2 was performed the first time. In step 910 it is determined whether there is such an excess amount of memory requirement and/or load requirement for the last blade N, i.e. blade 10. If this is not the case the resulting assignment of objects to blades is output in step 912.

If the contrary is the case step 914 is carried out in order to calculate the values of delta 5 and/or delta 6. Delta 5 is obtained by dividing the excess amount of memory, if any, by the number of blades N. Likewise delta 6 is obtained by dividing the excess load requirement, if any, by the number of blades N.

On this basis the size and/load thresholds are incremented in step 916. From there the control goes back to step 908.

Steps 908 to 916 are carried out repeatedly until there is no longer an excess amount of memory and/or load requirement that cannot be provided by the given number N of blades.

Figure 20:
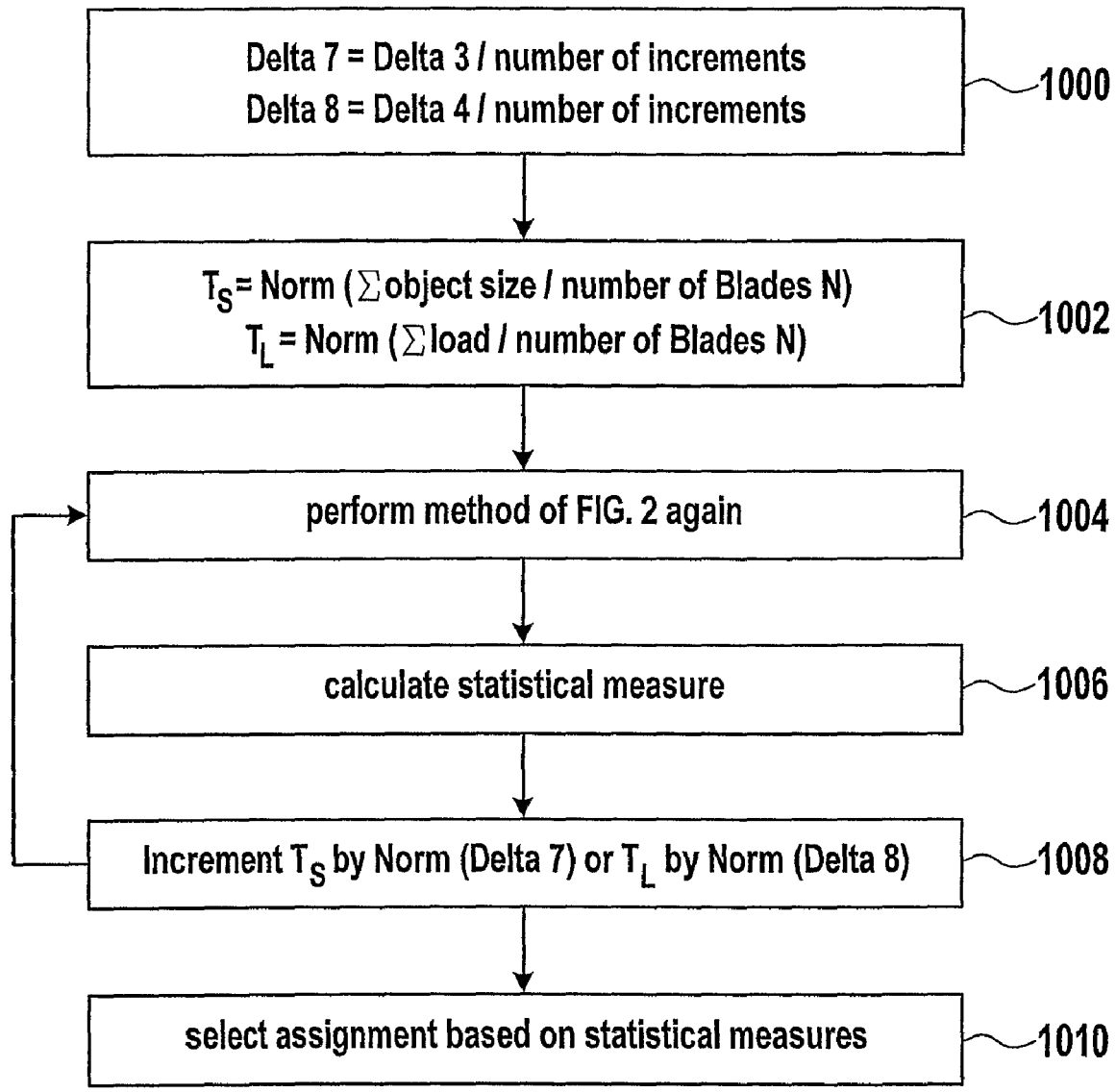
FIG. 20 is illustrative of a further preferred embodiment of the invention where the size and load thresholds are varied in predetermined steps.

FIG. 20 shows a further alternative for refinement of the balancing. First steps 900 and 902 of the method of FIG. 19 are carried out in order to obtain delta 3 and delta 4. The gaps delta 3 and delta 4 are now scanned by stepwise variation of the respective size and load thresholds in order to identify a more balanced assignment of objects to blades. For this purpose delta 3 and delta 4 are divided into equidistant intervals having step sizes delta 7 and delta 8, respectively, as shown in step 1000. The number of increments for performing the respective scans can be predefined or is user selectable.

It is to be noted that the number of increments for scanning $G_S$ and for scanning $G_L$ does not need to be the same. Preferably the scans are performed independently from each other such that the total number of assignments that is considered is the number of increments for the $G_S$ scan multiplied by the number of increments for the $G_L$ scan.

In step 1002 the size and load thresholds are set to the respective theoretical minima that are required to provide sufficient blade resources for handling of the given number of objects. On this basis the method of FIG. 2 is performed again in step 1004. In step 1006 a statistical measure is calculated as a quality measure for the balancing of the assignment of objects to blades obtained as a result of step 1006, if any. For example, the standard deviation of the aggregated sorting index values of objects assigned to each one of the blades is calculated. In other words, for each blade the total of the sorting index values of the objects that have been assigned to the blade is calculated. This provides one total sorting index value per blade. Next the standard deviation is calculated for the total sorting index values.

In step 1008 at least one of the thresholds $T_S$ or $T_L$ is incremented by the normalised value of delta 7 or the normalised value of delta 8, respectively. Next step 1004 is carried out again on the basis of the incremented size and load thresholds. Steps 1004 to 1008 are carried out repeatedly until the respective scans through $G_S$ and $G_L$ have been completed and the corresponding assignments of objects to blades have been obtained. In step 1010 one of the assignments is selected based on the statistical measures. For example, the assignment having the lowest standard deviation is selected.

It is to be noted that this procedure is limited by the minimum number of blades N. For assignments that do not fit on this given minimum number of blades N no statistical measure needs to be calculated as these assignments are not considered further in the procedure.

Figure 21:
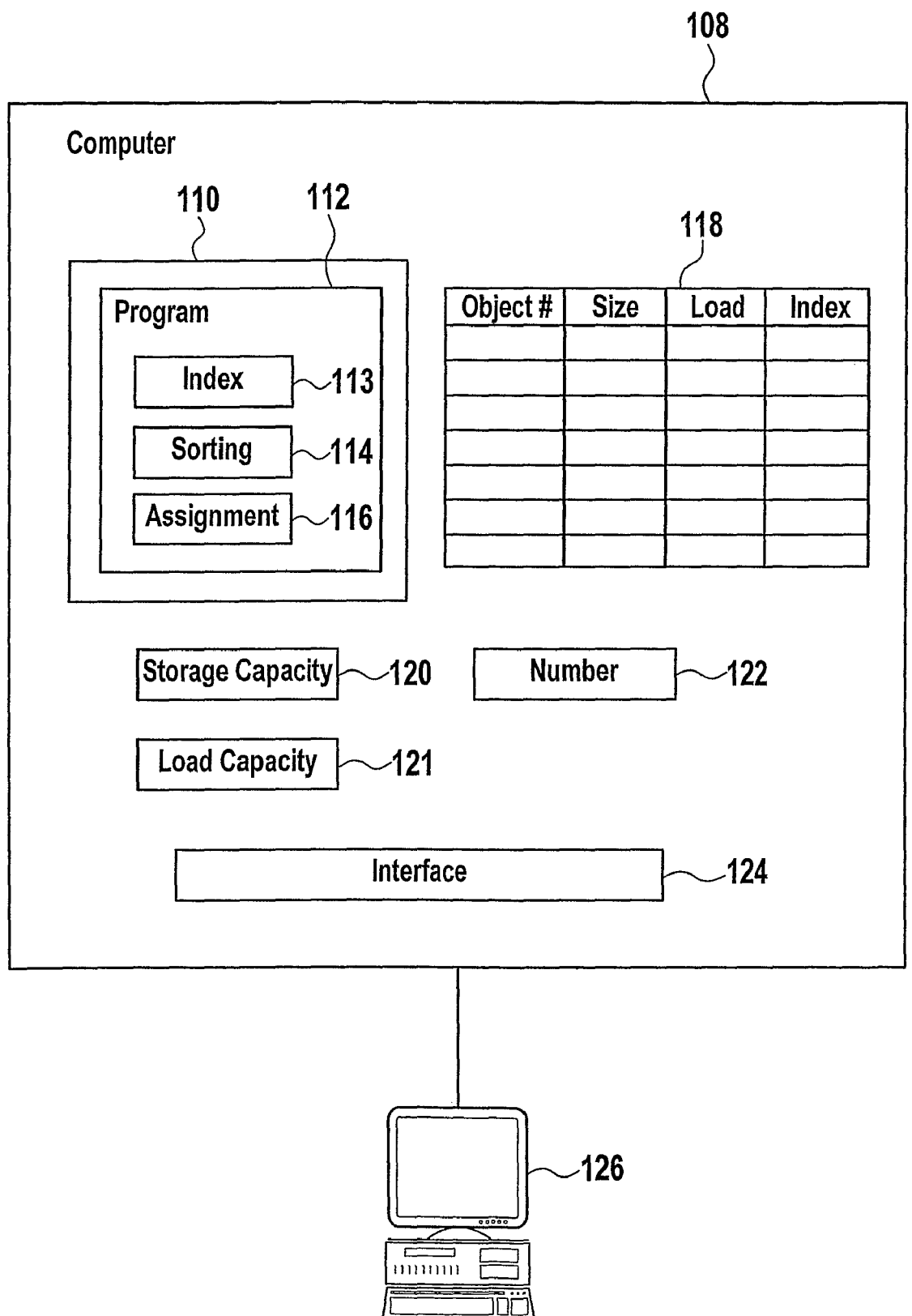
FIG. 21 is illustrative of a computer system performing the assignment of objects to blades.

FIG. 21 shows a computer 108 that has processor 110 for running program 112. Program 112 has module 113 for calculating a sorting index value for each object to be assigned to a blade. Further program 112 has module 114 for sorting of the objects by sorting index value and module 116 for assigning of objects to blades.

Further computer 108 has storage 118 for storing a table listing the objects, object sizes, and object loads of objects to be assigned to blades, storage 120 for storage of a storage capacity value of the blades, storage 121 for storage of a load capacity value of the blades, and storage 122 for storing of the number of blades. Further computer 108 has interface 124 for coupling to workstation 126.

In operation the table with the object names/numbers, object sizes and object loads is entered via interface 124 and stored in storage 118. Further a storage capacity value for the storage capacity of each individual blade is entered via interface 124 and stored in storage 120. Likewise a load capacity value for the load capacity of each individual blade is entered via interface 124 and stored in storage 121.

Next program 112 is invoked. Program 112 calculates a sorting index for each object contained in the table stored in storage 118 on the basis of the normalised object size and object load. The resulting indices are entered into the table stored in storage 118 by module 113. Next module 114 sorts the table of storage 118 by decreasing storage index to provide a sequence of objects (cf. the sequence of FIG. 8). Next module 116 performs the method of FIG. 2 in order to determine the minimum number of required blades.

This minimum number is stored in storage 122 and is output via user interface 124. This number can be a basis for a users investment decision for purchasing the number of blades to realise the data processing system being capable of handling the objects as listed in the table.

In addition, module 116 can perform the methods of FIGS. 18, 19 and/or 20 for refining of the balancing.

Alternatively, computer 108 is one of the blades. In this instance computer 108 can dynamically change the assignment of objects to blades when the object size changes. This way frequent swapping operations can be avoided. In other words, the creation of "hot spots" is prevented by balancing the load.

LIST OF REFERENCE NUMERALS 100 cluster
102 processor
104 memory
106 network
108 computer
110 processor
112 Program
113 module
114 module
116 module
118 storage
120 storage
121 storage
122 storage
124 interface
126 workstation

The invention claimed is:

1. A computer implemented method of assigning objects to a plurality of processing units, each of the objects having an object size and an object load, the method comprising:
   a) for each of the processing units, setting a storage capacity threshold and a load capacity threshold to initial values according to actual storage capacity and load capacity of the respective processing units;
   b) calculating an index value of each object based on the object's size and the object's load;
   c) sorting the objects by their index values to provide a sequence of objects;
   d) selecting at least one processing units to assign objects to, for each selected processing unit,
      assigning as many of the objects to the processing unit as fit within the storage capacity threshold and the load capacity threshold of the respective processing unit, the objects being assigned in sequence, and
      removing the assigned object(s) from the sequence;
   e) revising the storage capacity threshold and load capacity threshold to new values based on a total number of the processing units to which objects are assigned and unused capacity of the selected processing units; comprising:

determining a first largest gap between the aggregated size of objects being assigned to one of the selected processing units and the actual storage capacity of the processing unit, determining a second largest gap between the aggregated load of objects being assigned to one of the selected processing units and the actual load capacity of the processing unit, subtracting from the initial value of the storage capacity the first largest gap divided by the total number of selected processing units from the storage capacity to provide a revised storage capacity threshold, and subtracting from the initial value of the load capacity the second largest gap divided by the total number of selected processing units from the load capacity to provide a revised load capacity threshold;

f) performing step d) again using the revised storage capacity threshold and the revised load capacity threshold.

2. The computer implemented method of claim 1, wherein the index value of an object is calculated based on the sum of normalized object size and normalized object load and based on the absolute value of a difference between the normalized object size and the normalized object load.

3. The computer implemented method of claim 1, wherein the index values of the objects and the object sequence are saved and reused for each iteration of assigning operation.

4. A computer implemented method of assigning objects to a plurality of processing units, each of the objects having an object size and an object load, the method comprising:

a) for each of the processing units, setting a storage capacity threshold and a load capacity threshold to initial values according to actual storage capacity and load capacity of the respective processing units;

b) calculating an index value of each object based on the object's size and the object's load;

c) sorting the objects by their index values to provide a sequence of objects;

d) selecting at least one processing units to assign objects to, for each selected processing unit,
assigning as many of the objects to the processing unit as fit within the storage capacity threshold and the load capacity threshold of the respective processing unit, the objects being assigned in sequence, and
removing the assigned object(s) from the sequence;

e) determining a total of the sizes of the objects, f) determining a total of the loads of the objects, g) determining a first difference between the total of the storage capacities of the processing units and the total of the sizes of the objects, h) determining a second difference between the total of the load capacities of the processing units and the total of the load of the objects, i) subtracting the first difference divided by the number of processing units from the initial value of the storage capacity to provide a revised storage capacity threshold, j) subtracting the second difference divided by the number of processing units from the initial value of the load capacity to provide a revised load capacity threshold, k) performing step d) again, wherein the remaining storage capacity is determined by the difference between the aggregated size of the objects being assigned to the processing unit and the revised storage capacity threshold, and the remaining load capacity is determined by the difference between the aggregated load of the objects being assigned to the processing unit and the revised load capacity threshold, l) if as a result of k) there is an excess amount of memory requirement for one of the selected processing units that surpasses the revised storage capacity threshold, dividing the excess amount by the number of selected processing units and increasing the revised storage capacity threshold by the result of the division, and m) if as result of k) there is an excess load requirement for one of the processing units that surpasses the revised load capacity threshold, dividing the excess load by the number of selected processing units and increasing the revised load capacity threshold by the result of the division, wherein steps k), l) and m) are performed repeatedly until there is no such excess amount of memory requirement and no such excess load requirement.

5. The computer implemented method of claim 4, wherein the index value of an object is calculated based on the sum of normalized object size and normalized object load and based on the absolute value of a difference between the normalized object size and the normalized object load.

6. The computer implemented method of claim 4, wherein the index values of the objects and the object sequence are saved and reused for each iteration of assigning operation.

7. A computer implemented method of assigning objects to a plurality of processing units, each of the objects having an object size and an object load, the method comprising:

a) for each of the processing units, setting a storage capacity threshold and a load capacity threshold to initial values according to actual storage capacity and load capacity of the respective processing units;

b) calculating an index value of each object based on the object's size and the object's load;

c) sorting the objects by their index values to provide a sequence of objects;

d) selecting at least one processing units to assign objects to, for each selected processing unit,
assigning as many of the objects to the processing unit as fit within the storage capacity threshold and the load capacity threshold of the respective processing unit, the objects being assigned in sequence, and
removing the assigned object(s) from the sequence;

e) stepwise varying the storage capacity and load capacity thresholds between respective second limits and the respective initial values, f) performing d) for each storage capacity and load capacity threshold value, wherein the remaining storage capacity is the difference between the aggregated size of the objects being assigned to the processing unit and the storage capacity threshold, the remaining load capacity is the difference between the aggregated load of the objects being assigned to the processing unit and the load capacity threshold, and a statistical measure is calculated for the assignment of objects to the processing unit, and g) selecting one of the assignments of objects to processing units based on the statistical measure.

8. The computer implemented method of claim 7, wherein:
the second limit of the storage threshold is given by the aggregated size of the objects divided by the number of selected processing units,
the second limit of the load threshold is given by the aggregated load of the objects divided by the number of selected processing units.

9. The computer implemented method of claim 7, wherein the statistical measure is calculated by calculation of a standard deviation or a variance of the totals of the indices of objects assigned to one processing unit.

10. The computer implemented method of claim 7, wherein the index value of an object is calculated based on the sum of normalized object size and normalized object load and based on the absolute value of a difference between the normalized object size and the normalized object load.

11. The computer implemented method of claim 7, wherein the index values of the objects and the object sequence are saved and reused for each iteration of assigning operation.

12. An article of manufacture, comprising a machine readable medium having instructions for assigning objects to a plurality of processing units, each of the objects having an object size and an object load, the instructions comprising:
 a) for each of the processing units, setting a storage capacity threshold and a load capacity threshold to initial values according to actual storage capacity and load capacity of the respective processing units;
 b) calculating an index value of each object based on the object's size and the object's load;
 c) sorting the objects by their index values to provide a sequence of objects;
 d) selecting at least one processing units to assign objects to, for each selected processing unit,
  assigning as many of the objects to the processing unit as fit within the storage capacity threshold and the load capacity threshold of the respective processing unit, the objects being assigned in sequence, and
  removing the assigned object(s) from the sequence;
 e) revising the storage capacity threshold and load capacity threshold to new values based on a total number of the processing units to which objects are assigned and unused capacity of the selected processing units; comprising:
  determining a first largest gap between the aggregated size of objects being assigned to one of the selected processing units and the actual storage capacity of the processing unit,
  determining a second largest gap between the aggregated load of objects being assigned to one of the selected processing units and the actual load capacity of the processing unit,
  subtracting from the initial value of the storage capacity the first largest gap divided by the total number of selected processing units from the storage capacity to provide a revised storage capacity threshold, and
  subtracting from the initial value of the load capacity the second largest gap divided by the total number of selected processing units from the load capacity to provide a revised load capacity threshold;
 f) performing step d) again using the revised storage capacity threshold and the revised load capacity threshold.

13. The article of manufacture of claim 12, further comprising instructions to calculate the index value of an object on the basis of the sum of the normalized object size and normalized object load and on the basis of the absolute value of the difference of normalized object size and normalized object load.

14. The article of manufacture of claim 12, wherein the index values of the objects and the object sequence are saved and reused for each iteration of assigning operation.

15. An article of manufacture, comprising a machine readable medium having instructions for assigning objects to a plurality of processing units, each of the objects having an object size and an object load, the instructions comprising:
 a) for each of the processing units, setting a storage capacity threshold and a load capacity threshold to initial values according to actual storage capacity and load capacity of the respective processing units;
 b) calculating an index value of each object based on the object's size and the object's load;
 c) sorting the objects by their index values to provide a sequence of objects;
 d) selecting at least one processing units to assign objects to, for each selected processing unit,
  assigning as many of the objects to the processing unit as fit within the storage capacity threshold and the load capacity threshold of the respective processing unit, the objects being assigned in sequence, and
  removing the assigned object(s) from the sequence;
 e) determining a total of the sizes of the objects,
 f) determining a total of the loads of the objects,
 g) determining a first difference between the total of the storage capacities of the processing units and the total of the sizes of the objects,
 h) determining a second difference between the total of the load capacities of the processing units and the total of the load of the objects,
 i) subtracting the first difference divided by the number of processing units from the initial value of the storage capacity to provide a revised storage capacity threshold,
 j) subtracting the second difference divided by the number of processing units from the initial value of the load capacity to provide a revised load capacity threshold,
 k) performing step d) again, wherein the remaining storage capacity is determined by the difference between the aggregated size of the objects being assigned to the processing unit and the revised storage capacity threshold, and the remaining load capacity is determined by the difference between the aggregated load of the objects being assigned to the processing unit and the revised load capacity threshold,
 l) in case that as a result of k) there is an excess amount of memory requirement for one of the selected processing units that surpasses the revised storage capacity threshold, dividing the excess amount by the minimum number of processing units and increasing the revised storage capacity threshold by the result of the division, and
 m) in case that as a result of k) there is an excess load requirement for one of the processing units that surpasses the revised load capacity threshold, dividing the excess load by the number of processing units and increasing the revised load capacity threshold by the result of the division,
 wherein steps k), l) and m) are performed repeatedly until there is no such excess amount of memory requirement and no such excess load requirement.

16. The article of manufacture of claim 15, further comprising instructions to calculate the index value of an object on the basis of the sum of normalized object size and normalized object load and on the basis of the absolute value of the difference of normalized object size and normalized object load.

17. The article of manufacture of claim 15, wherein the index values and the object sequence are saved and reused for each iteration of assigning operation.

18. An article of manufacture, comprising a machine readable medium having instructions for assigning objects to a plurality of processing units, each of the objects having an object size and an object load, the instructions comprising:
 a) for each of the processing units, setting a storage capacity threshold and a load capacity threshold to initial values according to actual storage capacity and load capacity of the respective processing units;

b) calculating an index value of each object based on the object's size and the object's load;

c) sorting the objects by their index values to provide a sequence of objects;

d) selecting at least one processing units to assign objects to, for each selected processing unit, assigning as many of the objects to the processing unit as fit within the storage capacity threshold and the load capacity threshold of the respective processing unit, the objects being assigned in sequence, and removing the assigned object(s) from the sequence;

e) stepwise varying the storage capacity and load capacity thresholds between second limits and the respective initial values;

f) performing d) for each storage capacity and load capacity threshold value, wherein the remaining storage capacity is the difference between the aggregated size of the objects being assigned to the processing unit and the storage capacity threshold, the remaining load capacity is the difference between the aggregated load of the objects being assigned to the processing unit and the load capacity threshold, and a statistical measure is calculated for the assignment of objects to the processing unit, and g) selecting one of the assignments of objects to processing units based on the statistical measure.

19. The article of manufacture of claim 18, wherein the index values and the object sequence are saved and reused for each iteration of assigning operation.

20. The article of manufacture of claim 18, further comprising instructions to calculate the index value of an object on the basis of the sum of normalized object size and normalized object load and on the basis of the absolute value of the difference of normalized object size and normalized object load.

21. The article of manufacture of claim 18, wherein:

the second limit of the storage threshold is given by the aggregated size of the objects divided by the number of selected processing units, the second limit of the load threshold is given by the aggregated load of the objects divided by the number of selected processing units.

22. The article of manufacture of claim 18, wherein the statistical measure is calculated by calculation of a standard deviation or a variance of the totals of the index values of objects assigned to one processing unit.

23. A blade server comprising executable instructions, which when executed cause a processor associated with the blade server to execute a method for dynamically assigning objects to a plurality of blade servers, each one of the objects having an assigned index that is based on object size and object load, the method comprising:

a) for each of the processing units, setting a storage capacity threshold and a load capacity threshold to initial values according to actual storage capacity and load capacity of the respective processing units;

b) calculating an index value of each object based on the object's size and the object's load;

c) sorting the objects by their index values to provide a sequence of objects;

d) selecting at least one processing units to assign objects to, for each selected processing unit, assigning as many of the objects to the processing unit as fit within the storage capacity threshold and the load capacity threshold of the respective processing unit, the objects being assigned in sequence, and removing the assigned object(s) from the sequence;

e) revising the storage capacity threshold and load capacity threshold to new values based on a total number of the processing units to which objects are assigned and unused capacity of the selected processing units; comprising:

determining a first largest gap between the aggregated size of objects being assigned to one of the selected processing units and the actual storage capacity of the processing unit, determining a second largest gap between the aggregated load of objects being assigned to one of the selected processing units and the actual load capacity of the processing unit, subtracting from the initial value of the storage capacity the first largest gap divided by the total number of selected processing units from the storage capacity to provide a revised storage capacity threshold, and subtracting from the initial value of the load capacity the second largest gap divided by the total number of selected processing units from the load capacity to provide a revised load capacity threshold;

f) performing step d) again using the revised storage capacity threshold and the revised load capacity threshold.

* * * * *

UNITED STATES PATENT AND TRADEMARK OFFICE
CERTIFICATE OF CORRECTION

PATENT NO. : 7,664,858 B2
APPLICATION NO. : 10/584904
DATED : February 16, 2010
INVENTOR(S) : Volker Sauermann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 413 days.

Signed and Sealed this

Seventh Day of December, 2010

David J. Kappos
*Director of the United States Patent and Trademark Office*